(12) United States Patent
Nakai

(10) Patent No.: US 11,096,057 B2
(45) Date of Patent: Aug. 17, 2021

(54) COMMUNICATION CONTROL DEVICE, COMMUNICATION SYSTEM, AND COMMUNICATION CONTROL METHOD

(71) Applicant: Mitsubishi Electric Corporation, Tokyo (JP)

(72) Inventor: Yoshihiro Nakai, Kobe (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 273 days.

(21) Appl. No.: 16/323,460

(22) PCT Filed: Aug. 24, 2016

(86) PCT No.: PCT/JP2016/074626
§ 371 (c)(1),
(2) Date: Feb. 5, 2019

(87) PCT Pub. No.: WO2018/037493
PCT Pub. Date: Mar. 1, 2018

(65) Prior Publication Data
US 2019/0171818 A1     Jun. 6, 2019

(51) Int. Cl.
*H04L 29/06*     (2006.01)
*H04W 12/125*     (2021.01)
(Continued)

(52) U.S. Cl.
CPC .......... *H04W 12/125* (2021.01); *G06F 21/56* (2013.01); *G06F 21/567* (2013.01); *H04W 12/128* (2021.01); *G06F 2221/033* (2013.01)

(58) Field of Classification Search
CPC ......... H04W 12/1205; H04W 12/1208; H04W 12/125; H04W 12/128; H04L 63/1416; H04L 63/145; G06F 21/56; G06F 21/567
See application file for complete search history.

(56) References Cited

U.S. PATENT DOCUMENTS 8,725,330 B2 * 5/2014 Failing .................... B60L 55/00
                                                                701/22
9,173,100 B2 * 10/2015 Ricci ..................... G06F 11/079
(Continued)

FOREIGN PATENT DOCUMENTS

| JP | 2004-193903 A | 7/2004 |
|---|---|---|
| JP | 2014-143620 A | 7/2004 |

OTHER PUBLICATIONS

Zhang et al., "Defending Connected Vehicles Against Malware: Challenges and a Solution Framework," IEEE Internet of Things Journal, vol. 1, No. 1, Feb. 2014, pp. 10-21.
(Continued)

*Primary Examiner* — Hosuk Song
(74) *Attorney, Agent, or Firm* — Birch, Stewart, Kolasch & Birch, LLP

(57) ABSTRACT

A communication control device for a host vehicle including a plurality of host vehicle communication devices each including a different communication object, the communication control device including: an unauthorized state detector to detect an unauthorized state occurring from communication using an unauthorized host vehicle communication device out of the plurality of host vehicle communication devices; and a communication controller to execute control for transmitting host vehicle unauthorized state information related to the unauthorized state by using at least one normal host vehicle communication device out of the plurality of host vehicle communication devices excluding the unauthorized host vehicle communication device when the unauthorized state is detected.

17 Claims, 9 Drawing Sheets

(51) Int. Cl.
    *G06F 21/56*    (2013.01)
    *H04W 12/128*   (2021.01)

(56) References Cited

U.S. PATENT DOCUMENTS

| | | | |
|---|---|---|---|
| 9,389,149 B2* | 7/2016 | Paulin | B60B 3/165 |
| 9,525,700 B1* | 12/2016 | Malinowski | G06N 7/005 |
| 9,800,540 B2* | 10/2017 | O'Reirdan | H04L 61/1541 |
| 10,187,406 B2* | 1/2019 | Maeda | B60R 16/0231 |
| 10,277,598 B2* | 4/2019 | Kishikawa | H04L 12/40 |
| 2004/0093514 A1 | 5/2004 | Piazza et al. | |

OTHER PUBLICATIONS

Luo, Y. "Vehicle Encounter-based Forwarding for Infrastructure-to-Vehicle Data Delivery with Partial Stationary Nodes Coverage", In: Applied Mechanics and Materials, ISSN: 1662-7482, vols. 543-547, Mar. 24, 2014, pp. 4112-4116; DOI:10.4028/www.scientific.net/AMM.543-547.4112.

Offce Action dated Mar. 8, 2021 in corresponding German Patent Application No. 11 2016 007 088.8.

* cited by examiner

COMMUNICATION CONTROL DEVICE, COMMUNICATION SYSTEM, AND COMMUNICATION CONTROL METHOD

TECHNICAL FIELD

The present invention relates to a communication control device and a communication control method for a vehicle, and a communication system including the communication control device.

BACKGROUND ART

In recent years, from the viewpoint of supporting so-called "V2X (vehicle to everything) communication," a plurality of communication devices is provided in one vehicle. For example, in a vehicle C of Patent Literature 1, three in-vehicle communication devices of a mobile phone 11, a DSRC device 12, and a wireless communication device 13 are provided (see FIG. 1 of Patent Literature 1).

The vehicle C of Patent Literature 1 has a gateway device 10 that detects unauthorized access from outside the vehicle. When an unauthorized access is detected, the gateway device 10 identifies an entry path of the unauthorized access from among the mobile phone 11, the DSRC device 12, and the wireless communication device 13 and disconnects the connection of the identified in-vehicle communication device. As a result, access to the gateway device 10 and the in-vehicle devices from the entry path is blocked (see paragraph [0031] of Patent Literature 1).

Moreover, when disconnecting the connection of the identified in-vehicle communication device (for example, the mobile phone 11), the gateway device 10 of Patent Literature 1 switches the communication path to another communication path that goes through another in-vehicle communication device, which is the DSRC device 12 or the wireless communication device 13. With this configuration, it is ensured that the disconnection results in no impact when connection is established from an in-vehicle device to a communication network N outside the vehicle (see paragraphs and [0041] of Patent Literature 1).

CITATION LIST

Patent Literature

Patent Literature 1: JP 2004-193903 A

SUMMARY OF INVENTION

Technical Problem

In recent years, techniques of unauthorized access has become sophisticated, and it is important to place countermeasures against unauthorized access. In addition, so-called "malware" such as computer virus (hereinafter simply referred to as "virus"), Trojan horse, and worm is also becoming more sophisticated, and thus countermeasures against malware are also important.

An in-vehicle communication system of Patent Literature 1 protects the host vehicle from unauthorized access by using a detection result by the gateway device 10. However, as for this in-vehicle communication system, there is a problem in that a detection result in the host vehicle cannot be used for protection against unauthorized access in other vehicles. Moreover, since the gateway device 10 does not detect malware, there is a problem in that the host vehicle cannot be protected from malware and that other vehicles cannot be protected from malware, either.

The present invention has been made in order to solve the above problems, and it is an object of the present invention to provide a communication control device, a communication system, and a communication control method each capable of using a detection result of malware or the like in a host vehicle thereof for protection from malware or the like in other vehicles.

Solution to Problem

A communication control device according to the present invention is a communication control device for a vehicle including a plurality of host vehicle communication devices each including a different communication object, the communication control device including: an unauthorized state detector to detect an unauthorized state occurring from communication using an unauthorized host vehicle communication device out of the plurality of host vehicle communication devices; and a communication controller to execute control for transmitting host vehicle unauthorized state information related to the unauthorized state by using at least one normal host vehicle communication device out of the plurality of host vehicle communication devices excluding the unauthorized host vehicle communication device when the unauthorized state is detected.

A communication system of the present invention is a communication system including a communication control device for a vehicle including a plurality of host vehicle communication devices each including a different communication object, the communication control device including: an unauthorized state detector to detect an unauthorized state occurring from communication using an unauthorized host vehicle communication device out of the plurality of host vehicle communication devices; and a communication controller to execute control for transmitting host vehicle unauthorized state information related to the unauthorized state by using at least one normal host vehicle communication device out of the plurality of host vehicle communication devices excluding the unauthorized host vehicle communication device when the unauthorized state is detected.

A communication control method according to the present invention is a communication control method for a vehicle including a plurality of host vehicle communication devices each including a different communication object, the method including: detecting, by an unauthorized state detector, an unauthorized state occurring from communication using an unauthorized host vehicle communication device out of the plurality of host vehicle communication devices; and executing, by a communication controller, control for transmitting host vehicle unauthorized state information related to the unauthorized state by using at least one normal host vehicle communication device out of the plurality of host vehicle communication devices excluding the unauthorized host vehicle communication device when the unauthorized state is detected.

Advantageous Effects of Invention

According to the present invention, when an unauthorized state is detected, control for transmitting host vehicle unauthorized state information using a normal host vehicle communication device is executed. As a result, the detection result of the unauthorized state in the host vehicle can be used for protection from an unauthorized state in another vehicle.

DESCRIPTION OF EMBODIMENTS

To describe the present invention further in detail, embodiments for carrying out the present invention will be described below along accompanying drawings.

First Embodiment

Figure 1:
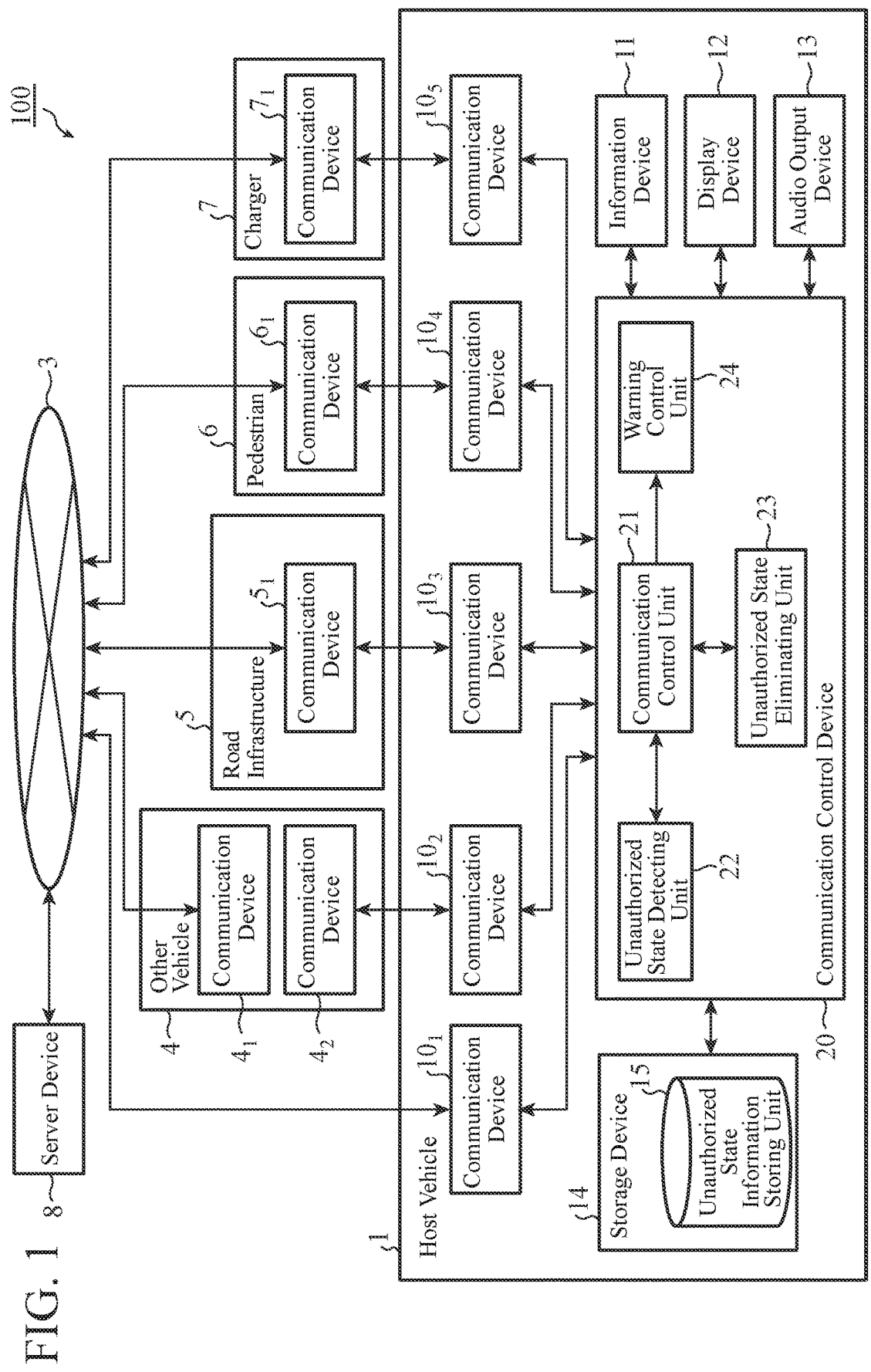
FIG. 1 is a functional block diagram illustrating a main part of a communication system according to a first embodiment of the present invention.
Figure 2:
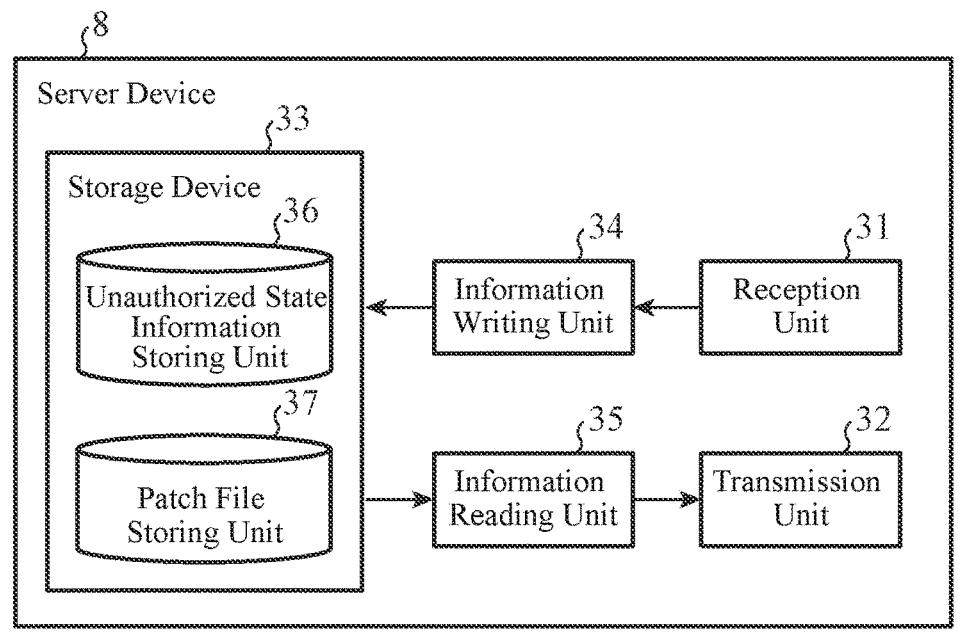
FIG. 2 is a functional block diagram illustrating a main part of a server device according to the first embodiment of the present invention.
Figure 3:
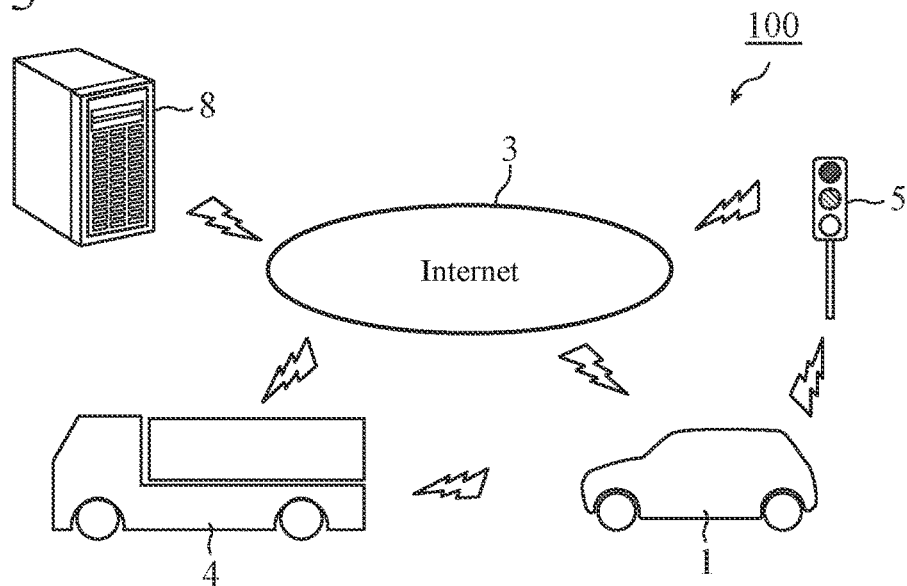
FIG. 3 is an explanatory diagram illustrating an outline of a system configuration of the communication system according to the first embodiment of the present invention.
Figure 4:
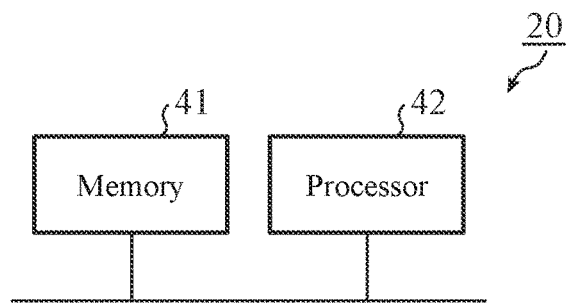
FIG. 4 is a hardware configuration diagram illustrating a main part of a communication control device according to the first embodiment of the present invention.
Figure 5:
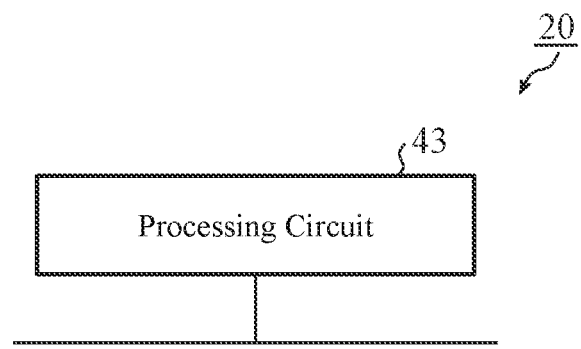
FIG. 5 is another hardware configuration diagram illustrating the main part of the communication control device according to the first embodiment of the present invention.
Figure 6:
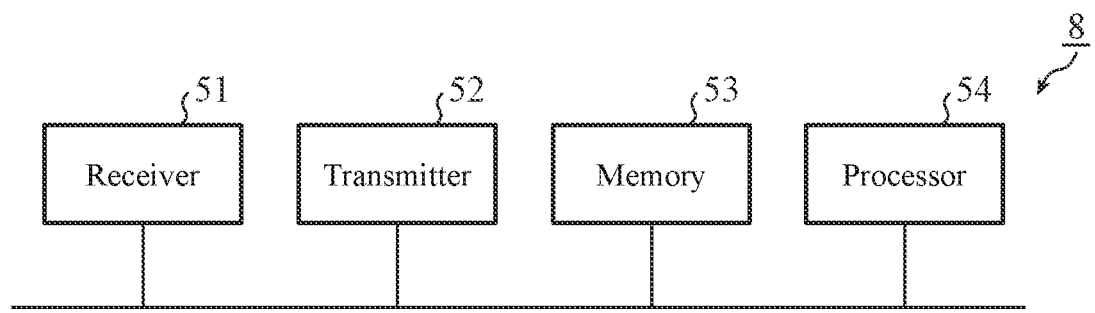
FIG. 6 is a hardware configuration diagram illustrating the main part of the server device according to the first embodiment of the present invention.
Figure 7:
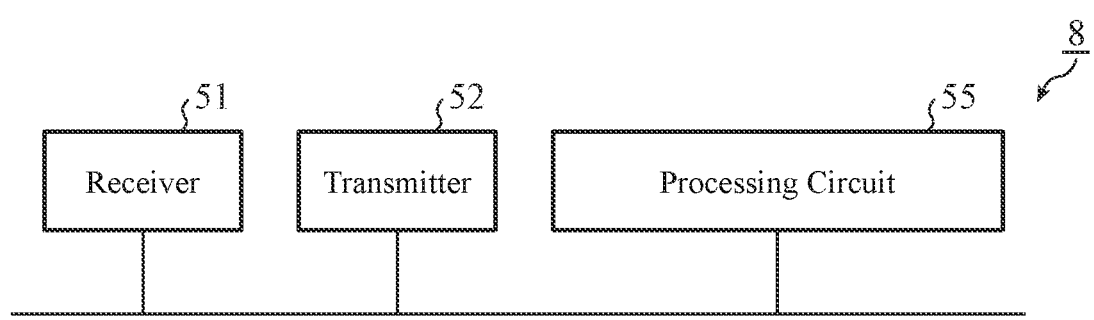
FIG. 7 is another hardware configuration diagram illustrating the main part of the server device according to the first embodiment of the present invention.

FIG. 1 is a functional block diagram illustrating a main part of a communication system according to a first embodiment of the present invention. FIG. 2 is a functional block diagram illustrating a main part of a server device according to the first embodiment of the present invention. FIG. 3 is an explanatory diagram illustrating an outline of a system configuration of the communication system according to the first embodiment of the present invention. FIG. 4 is a hardware configuration diagram illustrating a main part of a communication control device according to the first embodiment of the present invention. FIG. 5 is another hardware configuration diagram illustrating the main part of the communication control device according to the first embodiment of the present invention. FIG. 6 is a hardware configuration diagram illustrating the main part of the server device according to the first embodiment of the present invention. FIG. 7 is another hardware configuration diagram illustrating the main part of the server device according to the first embodiment of the present invention. With reference to FIGS. 1 to 7, a communication control device 20 and a communication system 100 according to the first embodiment will be described.

A host vehicle 1 has a plurality of (five in the example of FIG. 1) communication devices $10_1$ to $10_5$. Hereinafter, the communication devices $10_1$ to $10_5$ of the host vehicle 1 are referred to as "host vehicle communication devices."

The host vehicle communication device $10_1$ includes a communication device for Internet connection. Specifically, for example, the host vehicle communication device $10_1$ includes a mobile phone terminal such as a smartphone brought into the host vehicle 1, a portable information terminal such as a tablet computer including a subscriber identity module (SIM) card, or a portable router for wireless communication supported by the worldwide interoperability for microwave access (WiMAX) standard.

The host vehicle communication device $10_1$ directly communicates with a base station (not illustrated) and is connected to the Internet 3 via the base station. The host vehicle communication device $10_1$ communicates with a communication device $4_1$ for Internet connection in another vehicle 4, a communication device $5_1$ provided in road infrastructure 5 such as a traffic signal, a communication device $6_1$ such as a mobile phone terminal held by a pedestrian 6, a communication device $7_1$ provided in a charger 7 such as a charging stand for electric vehicles (EVs), and a server device 8 via the Internet 3.

The host vehicle communication device $10_2$ includes a communication device for inter-vehicle communication. The host vehicle communication device $10_2$ directly communicates with a communication device $4_2$ for inter-vehicle communication of the other vehicle 4. Specifically, for example, the host vehicle communication device $10_2$ communicates with the communication device $4_2$ using a radio wave of a frequency band (for example, 700 MHz band) for intelligent transport systems (ITS).

The host vehicle communication device $10_3$ includes a communication device for road-to-vehicle communication. The host vehicle communication device $10_3$ directly communicates with the communication device $5_1$ provided in the road infrastructure 5. Specifically, for example, the host vehicle communication device $10_3$ communicates with the communication device $5_1$ using a radio wave of a frequency band (for example, 700 MHz band) for ITS.

The host vehicle communication device $10_4$ includes a communication device for pedestrian-to-vehicle communication. The host vehicle communication device $10_4$ directly communicates with the communication device $6_1$ held by the pedestrian 6. Specifically, for example, the host vehicle communication device $10_4$ communicates with the communication device $6_1$ by wireless communication based on the Wi-Fi standard.

The host vehicle communication device $10_5$ includes a communication device for communication with a charger. The host vehicle communication device $10_5$ directly communicates with the communication device $7_1$ provided in the charger 7. Specifically, for example, the host vehicle communication device $10_5$ communicates with the communication device $7_1$ by wired communication using a wired connection line when the host vehicle 1 is connected to the charger 7 in a wired manner. Alternatively, the host vehicle communication device $10_5$ communicates with the communication device $7_1$ by wireless communication based on the Wi-Fi standard.

In other words, the host vehicle communication devices $10_1$ to $10_5$ each have a different direct communication object (the base station, the other vehicle 4, the road infrastructure 5, the pedestrian 6, or the charger 7). Therefore, the host vehicle communication devices $10_1$ to $10_5$ each have a different communication path to/from the Internet 3.

The other vehicle 4 has, in addition to the communication device $4_1$ for Internet connection and the communication device $4_2$ for inter-vehicle communication, a communication device for road-to-vehicle communication (not illustrated), a communication device for pedestrian-to-vehicle communication (not illustrated), and a communication device for communication with a charger (not illustrated) similar to those of the host vehicle 1. Hereinafter, the communication devices of the other vehicle 4 are referred to as "other vehicle communication devices." Moreover, the other vehicle 4 has a communication control device (not illustrated) similar to that of the host vehicle 1.

The communication device $5_1$ provided in the road infrastructure 5 has a function of communicating with the server device 8 via the Internet 3. The communication device $6_1$ held by the pedestrian 6 has a function of communicating with the server device 8 via the Internet 3. The communication device $7_1$ provided in the charger 7 has a function of communicating with the server device 8 via the Internet 3.

The host vehicle 1 has an information device 11 such as an in-vehicle multimedia device or an electronic control unit (ECU). The host vehicle 1 has a display device 12 such as a liquid crystal display or an organic electro luminescence (EL) display. The host vehicle 1 has an audio output device 13 such as a speaker. The host vehicle 1 has a storage device 14 such as a hard disk drive (HDD) or a solid state drive (SSD).

The host vehicle 1 has the communication control device 20. The communication control device 20 includes, for example, a gateway device mounted in the host vehicle 1. The communication control device 20 includes a communication control unit 21, an unauthorized state detecting unit 22, an unauthorized state eliminating unit 23, and a warning control unit 24.

The communication control unit 21 controls communication by the host vehicle communication devices $10_1$ to $10_5$. Since the operation of the communication control unit 21 varies widely, descriptions are given below as appropriate together with description of other functional blocks.

The unauthorized state detecting unit 22 detects an unauthorized state occurring from communication using one of the plurality of host vehicle communication devices $10_1$ to $10_5$ (hereinafter referred to as "unauthorized host vehicle communication device"). An unauthorized state refers to, for example, a state in which various types of data stored in the host vehicle communication devices $10_1$ to $10_5$, the information device 11, or the storage device 14 or a program or a library corresponding to the communication control unit 21 in the communication control device 20 is infected with malware. The unauthorized state refers to, for example, a state in which the host vehicle communication devices $10_1$ to $10_5$, the information device 11, or the communication control device 20 have received unauthorized access such as denial of service (DoS) attack.

When detecting an unauthorized state, the unauthorized state detecting unit 22 stores information related to this unauthorized state (hereinafter referred to as "unauthorized state information") in the unauthorized state information storing unit 15 in the storage device 14. The unauthorized state information indicates, for example, a communication path used for communication which is the cause of the unauthorized state (hereinafter referred to as "unauthorized communication path"). In addition, the unauthorized state information indicates a host vehicle communication device used for the communication which is the cause of the unauthorized state, that is, an unauthorized host vehicle communication device. The unauthorized state information also indicates the content of the detected unauthorized state. The unauthorized state information further indicates the basis for the detection of the occurrence of unauthorized state.

For example, it is assumed that, in a case where the information device 11 is infected with malware by communication using the host vehicle communication device $10_1$, the unauthorized state detecting unit 22 has executed a malware infection check by pattern matching and detected the malware. In this case, an in-vehicle communication path between the information device 11 and the communication control device 20, an in-vehicle communication path between the communication control device 20 and the host vehicle communication device $10_1$, and a communication path outside the vehicle between the host vehicle communication device $10_1$ and the base station correspond to unauthorized communication paths indicated by unauthorized state information. Moreover, the host vehicle communication device $10_1$ corresponds to an unauthorized host vehicle communication device indicated by the unauthorized state information. In addition, the content of the detected malware and the fact that the malware infection check by the unauthorized state detecting unit 22 is the basis of the detection are also indicated by the unauthorized state information.

Note that in the case where an unauthorized state is detected, when it is not possible to identify the unauthorized communication path, the unauthorized host vehicle communication device, the content of the unauthorized state, or the like, the unauthorized state information may not contain such information.

Hereinafter, unauthorized state information related to an unauthorized state occurring in the host vehicle 1 is referred to as "host vehicle unauthorized state information." Meanwhile, unauthorized state information related to an unauthorized state occurring in the other vehicle 4 is referred to as "other vehicle unauthorized state information."

When an unauthorized state is detected by the unauthorized state detecting unit 22, the communication control unit 21 sets a normal host vehicle communication device to be used for transmission of the host vehicle unauthorized state information from among the plurality of host vehicle communication devices $10_1$ to $10_5$ excluding the unauthorized host vehicle communication device (hereinafter referred to as "normal host vehicle communication device"). The communication control unit 21 executes control for transmitting the host vehicle unauthorized state information by using the normal host vehicle communication device having been set.

For example when the host vehicle communication device $10_1$ is set as the normal host vehicle communication device for transmission, the host vehicle communication device $10_1$ transmits the host vehicle unauthorized state information to the server device 8 via the Internet 3.

Alternatively, when the host vehicle communication device $10_2$ is set as the normal host vehicle communication device for transmission, the host vehicle communication device $10_2$ transmits the host vehicle unauthorized state information to the communication device $4_2$ for inter-vehicle communication provided in the other vehicle 4. The communication control device provided in the other vehicle 4 executes control for transmitting the host vehicle unauthorized state information to the server device 8 via the Internet 3 by using the communication device $4_1$ for Internet connection.

When the host vehicle communication device $10_3$ is set as the normal host vehicle communication device for transmission, the host vehicle communication device $10_3$ transmits the host vehicle unauthorized state information to the communication device $5_1$ provided in the road infrastructure 5. The communication device $5_1$ transmits the host vehicle unauthorized state information to the server device 8 via the Internet 3.

Alternatively, when the host vehicle communication device $10_4$ is set as the normal host vehicle communication device for transmission, the host vehicle communication device $10_4$ transmits the host vehicle unauthorized state information to the communication device $6_1$ held by the pedestrian 6. The communication device $6_1$ transmits the host vehicle unauthorized state information to the server device 8 via the Internet 3.

When the host vehicle communication device $10_5$ is set as the normal host vehicle communication device for transmission, the host vehicle communication device $10_5$ transmits host vehicle unauthorized state information to the communication device $7_1$ provided in the charger 7. The communication device $7_1$ transmits the host vehicle unauthorized state information to the server device 8 via the Internet 3.

Note that in a case where there are a plurality of normal host vehicle communication devices, the communication control unit 21 may execute control for transmitting the host vehicle unauthorized state information by using two or more normal host vehicle communication devices available for transmission of the host vehicle unauthorized state information or by using all of the normal host vehicle communication devices available for transmission of the host vehicle unauthorized state information.

Alternatively, a default host vehicle communication device used for transmission of the host vehicle unauthorized state information may be set in the communication control unit 21 in advance. In this case, when the host vehicle communication device is a normal host vehicle communication device and the host vehicle communication device is available for transmission of the host vehicle unauthorized state information, the communication control unit 21 uses the host vehicle communication device for transmission of the host vehicle unauthorized state information. On the other hand, when the host vehicle communication device is a normal host vehicle communication device but the host vehicle communication device is not available for transmission of the host vehicle unauthorized state information, or when the vehicle communication device is the unauthorized host vehicle communication device, the communication control unit 21 uses a normal host vehicle communication device, which is not that host vehicle communication device, for transmission of the host vehicle unauthorized state information. Note that, in general, since the host vehicle communication device $10_1$ for Internet connection is more likely to be an unauthorized host vehicle communication device than the other host vehicle communication devices $10_2$ to $10_5$, it is preferable to set any one of the other host vehicle communication devices $10_2$ to $10_5$ as default.

As illustrated in FIG. 2, the server device 8 has a reception unit 31 and a transmission unit 32 that communicate with the communication devices $4_1$, $5_1$, $6_1$, $7_1$, and $10_1$ via the Internet 3. The server device 8 further includes an information writing unit 34 that writes information received by the reception unit 31 in a storage device 33, and an information reading unit 35 that reads information stored in the storage device 33 and outputs the information to the transmission unit 32.

In the storage device 33, an unauthorized state information storing unit 36 is provided. The unauthorized state information storing unit 36 stores unauthorized state information of respective vehicles received by the reception unit 31. In addition, the unauthorized state information storing unit 36 stores information indicating a communication path used for reception of the unauthorized state information.

In the storage device 33, a patch file storing unit 37 is included. The patch file storing unit 37 stores patch files for security against unauthorized states.

When the reception unit 31 receives unauthorized state information in any vehicle, the information writing unit 34 causes the unauthorized state information storing unit 36 to store the unauthorized state information and information indicating a communication path used for reception of the unauthorized state information. Moreover, the information reading unit 35 reads a patch file corresponding to the content of the unauthorized state indicated by the unauthorized state information from the patch file storing unit 37 and outputs the patch file to the transmission unit 32. The transmission unit 32 transmits the patch file to the vehicle from which the unauthorized state information has been transmitted, via the Internet 3.

At this time, the information reading unit 35 reads information indicating the communication path used for reception of the unauthorized state information from the unauthorized state information storing unit 36 and outputs the information to the transmission unit 32. Using the information, the transmission unit 32 sets the communication path used for transmission of the patch file as the same path as the communication path used for reception of the unauthorized state information.

That is, when the transmission unit 32 transmits the patch file to the host vehicle 1, the communication path used for this transmission does not go through the unauthorized host vehicle communication device but goes through a normal host vehicle communication device. The communication control unit 21 executes control for receiving the patch file transmitted by the server device 8 using the normal host vehicle communication device.

The unauthorized state eliminating unit 23 eliminates the unauthorized state by using the received patch file. Specifically, for example, in the case where the content of the unauthorized state is malware infection, the unauthorized state eliminating unit 23 applies a patch file to various types of data described in the host vehicle communication devices $10_1$ to $10_5$, the information device 11, and the storage device 14, or a program or a library corresponding to the communication control unit 21 in the communication control device 20. By applying the patch file, the malware is removed. Alternatively, for example in the case where the content of the unauthorized state is an unauthorized access, the unauthorized state eliminating unit 23 applies a patch file to the host vehicle communication devices $10_1$ to $10_5$, the information device 11, or the communication control device 20. Applying the patch file completes the permanent countermeasure against the unauthorized access.

When the application of the patch file is completed, the unauthorized state eliminating unit 23 regards that the unauthorized state has been eliminated and, from among host vehicle unauthorized state information stored in the unauthorized state information storing unit 15, erases the host vehicle unauthorized state information.

When the application of the patch file by the unauthorized state eliminating unit 23 is completed, the communication control unit 21 executes control for transmitting information indicating that the unauthorized state has been eliminated (hereinafter referred to as "elimination information") by using one of the host vehicle communication devices $10_1$ to $10_5$. The elimination information is transmitted to the server device 8 via the Internet 3 through any one of the communication paths described above as a communication path for transmission of the host vehicle unauthorized state information corresponding to the patch file.

Hereinafter, elimination information corresponding to an unauthorized state generated in the host vehicle 1 is referred to as "host vehicle elimination information." Also, elimination information corresponding to an unauthorized state generated in the other vehicle 4 is referred to as "other vehicle elimination information."

In the server device 8, when the reception unit 31 receives the elimination information, the information writing unit 34 erases the unauthorized state information corresponding to the elimination information from the unauthorized state information storing unit 36.

When receiving other vehicle unauthorized state information from the other vehicle 4 by inter-vehicle communication using the host vehicle communication device $10_2$, the communication control unit 21 uses the host vehicle communication device $10_1$ for Internet connection to transmit the other vehicle unauthorized state information to the server device 8. Furthermore, when receiving other vehicle elimination information from the other vehicle 4 by inter-vehicle communication using the host vehicle communication device $10_2$, the communication control unit 21 uses the host vehicle communication device $10_1$ for Internet connection to transmit the other vehicle elimination information to the server device 8.

In the case where an unauthorized state has occurred in the other vehicle 4, the communication control unit 21 blocks communication between each of the host vehicle communication devices $10_1$ to $10_5$ and a communication device of the other vehicle used for communication which is a cause of the unauthorized state in the other vehicle 4 (hereinafter referred to as "unauthorized other vehicle communication device"). Specifically, for example, the communication control unit 21 filters an Internet protocol (IP) address, a media access control (MAC) address, or the like assigned to the unauthorized other vehicle communication device.

Specifically, for example, the communication control unit 21 communicates with the server device 8 using the host vehicle communication device $10_1$ for Internet connection and inquires whether other vehicle unauthorized state information related to the other vehicle 4 is stored in the unauthorized state information storing unit 36. The server device 8 transmits an inquiry result to the host vehicle 1 and transmits the other vehicle unauthorized state information to the host vehicle 1 when the unauthorized state information related to the other vehicle 4 is stored in the unauthorized state information storing unit 36. Using the received inquiry result, the communication control unit 21 determines whether an unauthorized state has occurred in the other vehicle 4 to be communicated with. In addition, the communication control unit 21 identifies the unauthorized other vehicle communication device by using the received other vehicle unauthorized state information.

When an unauthorized state is detected by the unauthorized state detecting unit 22 and a predetermined condition is satisfied (details will be described later), the warning control unit 24 generates image data indicating occurrence of the unauthorized state on the basis of the content of the host vehicle unauthorized state information. The warning control unit 24 outputs the image data to the display device 12 and causes the display device 12 to display an image corresponding to the image data (hereinafter referred to as "warning image").

In addition, the warning control unit 24 generates audio data indicating occurrence of the unauthorized state on the basis of the content of the host vehicle unauthorized state information. The warning control unit 24 outputs the audio data to the audio output device 13 and causes the audio output device 13 to output sound corresponding to the audio data (hereinafter referred to as "warning sound").

Since the communication control device of the other vehicle 4 is configured similarly to the communication control device 20 of the host vehicle 1, description thereof is omitted.

In FIG. 3, an overview of a system configuration of the communication system 100 configured in the above manner is illustrated. As described above, the host vehicle 1 communicates directly with the base station (not illustrated) and connects to the Internet 3 via the base station, thereby the host vehicle 1 can freely communicate with the other vehicle 4, the road infrastructure 5, the pedestrian 6, the charger 7, and the server device 8 via the Internet 3. Furthermore, the host vehicle 1 is capable of directly communicating with the other vehicle 4 by inter-vehicle communication, capable of directly communicating with the road infrastructure 5 by road-to-vehicle communication, capable of directly communicable with the pedestrian 6 by pedestrian-to-vehicle communication, and capable of directly communicating with the charger 7. The other vehicle 4 is capable of freely communicating with the server device 8 via the Internet 3, the road infrastructure 5 is capable of freely communicating with the server device 8 via the Internet 3, and the pedestrian 6 is capable of freely communicating with the server device 8 via the Internet 3, and the charger 7 is capable of freely communicating with the server device 8 via the Internet 3. Note that in FIG. 3 the pedestrian 6 and the charger 7 are not illustrated.

In FIG. 4 an example of a hardware configuration of the main part of the communication control device 20 is illustrated. As illustrated in FIG. 4, the communication control device 20 includes a general-purpose computer and has a memory 41 and a processor 42. The memory 41 stores a program for allowing the computer to function as the communication control unit 21, the unauthorized state detecting unit 22, the unauthorized state eliminating unit 23, and the warning control unit 24 illustrated in FIG. 1. Reading and executing the program stored in the memory 41 by the processor 42 results in implementation of the functions of the communication control unit 21, the unauthorized state detecting unit 22, the unauthorized state eliminating unit 23, and the warning control unit 24 illustrated in FIG. 1.

The memory 41 includes a semiconductor memory such as a random access memory (RAM), a read only memory (ROM), a flash memory, an erasable programmable read only memory (EPROM), or an electrically erasable programmable read only memory (EEPROM). The processor 42 includes, for example, a central processing unit (CPU), a graphics processing unit (GPU), a digital signal processor (DSP), a microcontroller, a microprocessor, or the like.

In FIG. 5 another example of a hardware configuration of the main part of the communication control device 20 is illustrated. As illustrated in FIG. 5, the communication control device 20 may be configured by a dedicated processing circuit 43. The processing circuit 43 may be, for example, an application specific integrated circuit (ASIC), a field-programmable gate array (FPGA), a system large-scale integration (LSI), or a combination thereof.

Note that functions of the communication control unit 21, the unauthorized state detecting unit 22, the unauthorized state eliminating unit 23, and the warning control unit 24 illustrated in FIG. 1 may be separately implemented by the processing circuit 43, or the functions of the respective units may be collectively implemented by the processing circuit 43. In addition, some of the functions of the communication control unit 21, the unauthorized state detecting unit 22, the unauthorized state eliminating unit 23, and the warning control unit 24 illustrated in FIG. 1 may be implemented by the memory 41 and the processor 42 illustrated in FIG. 4, and the remaining functions may be implemented by the processing circuit 43 illustrated in FIG. 5.

In FIG. 6 an example of a hardware configuration of the main part of the server device 8 is illustrated. The reception unit 31 illustrated in FIG. 2 is implemented by a dedicated receiver 51. The transmission unit 32 illustrated in FIG. 2 is implemented by a dedicated transmitter 52. The storage device 33 illustrated in FIG. 2 is implemented by a memory 53. In the memory 53, programs for implementing the functions of the information writing unit 34 and the information reading unit 35 illustrated in FIG. 2 are stored. Reading and executing the program stored in the memory 53 by a processor 54 results in implementation of the functions of the information writing unit 34 and the information reading unit 35 illustrated in FIG. 2.

The memory 53 includes, for example, a semiconductor memory such as a RAM, a ROM, a flash memory, an EPROM, an EEPROM, or an SSD, or a magnetic storage device such as an HDD. The processor 54 includes, for example, a CPU, a GPU, a DSP, a microcontroller, a microprocessor, or the like.

In FIG. 7 another example of a hardware configuration of the main part of the server device 8 is illustrated. As illustrated in FIG. 7, the server device 8 may be configured by a dedicated processing circuit 55. The processing circuit 55 is, for example, an ASIC, an FPGA, a system LSI, or a combination thereof.

Note that functions of the information writing unit 34 and the information reading unit 35 illustrated in FIG. 2 may be separately implemented by the processing circuit 55. Alternatively, the functions of the units may be collectively implemented by the processing circuit 55. In addition, some of the functions of the information writing unit 34 and the information reading unit 35 illustrated in FIG. 2 may be implemented by the memory 53 and the processor 54 illustrated in FIG. 6, and the remaining functions may be implemented by the processing circuit 55 illustrated in FIG. 7.

Figure 8A:
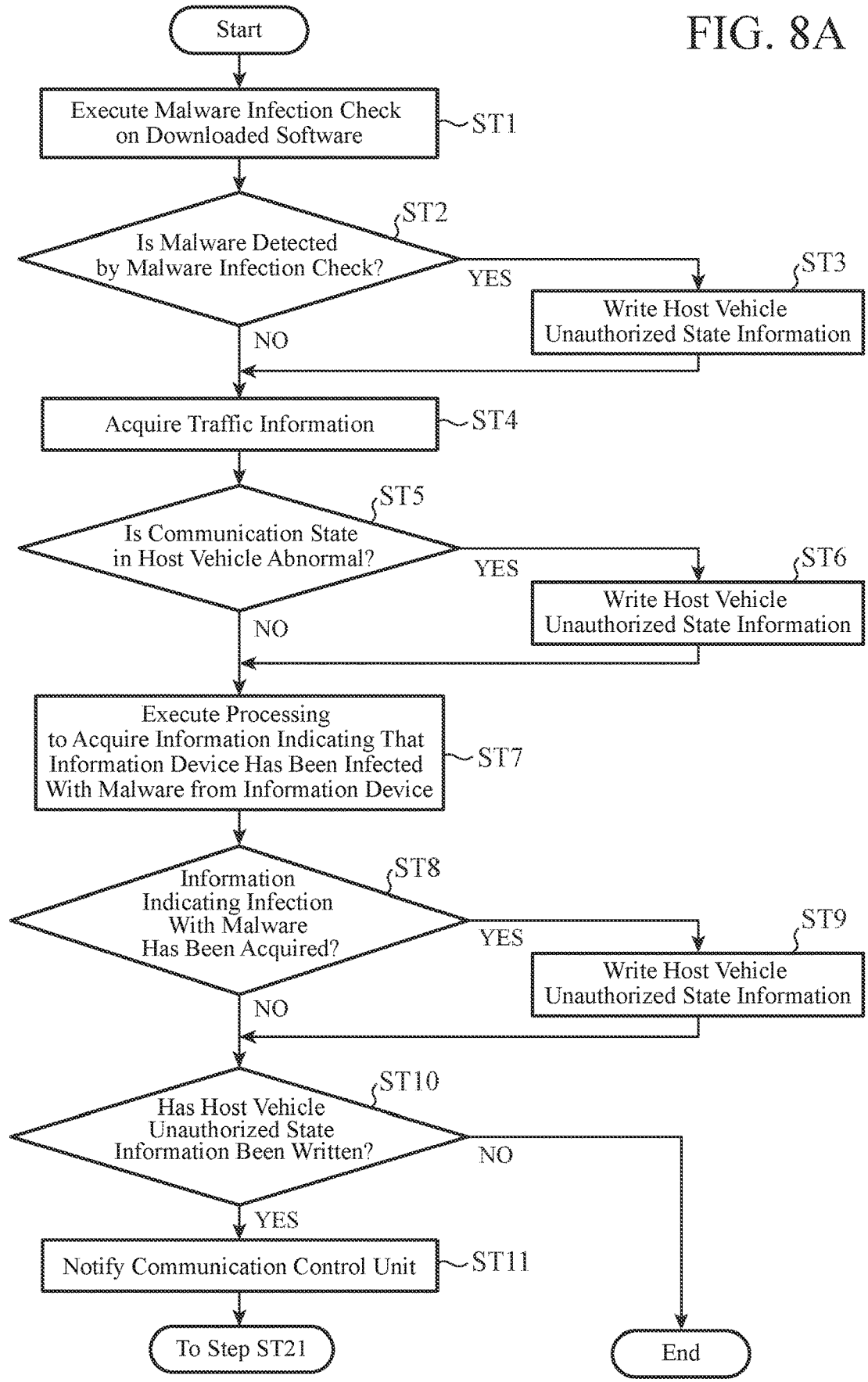
FIG. 8A is a flowchart illustrating the operation of the communication control device according to the first embodiment of the present invention.
Figure 8B:
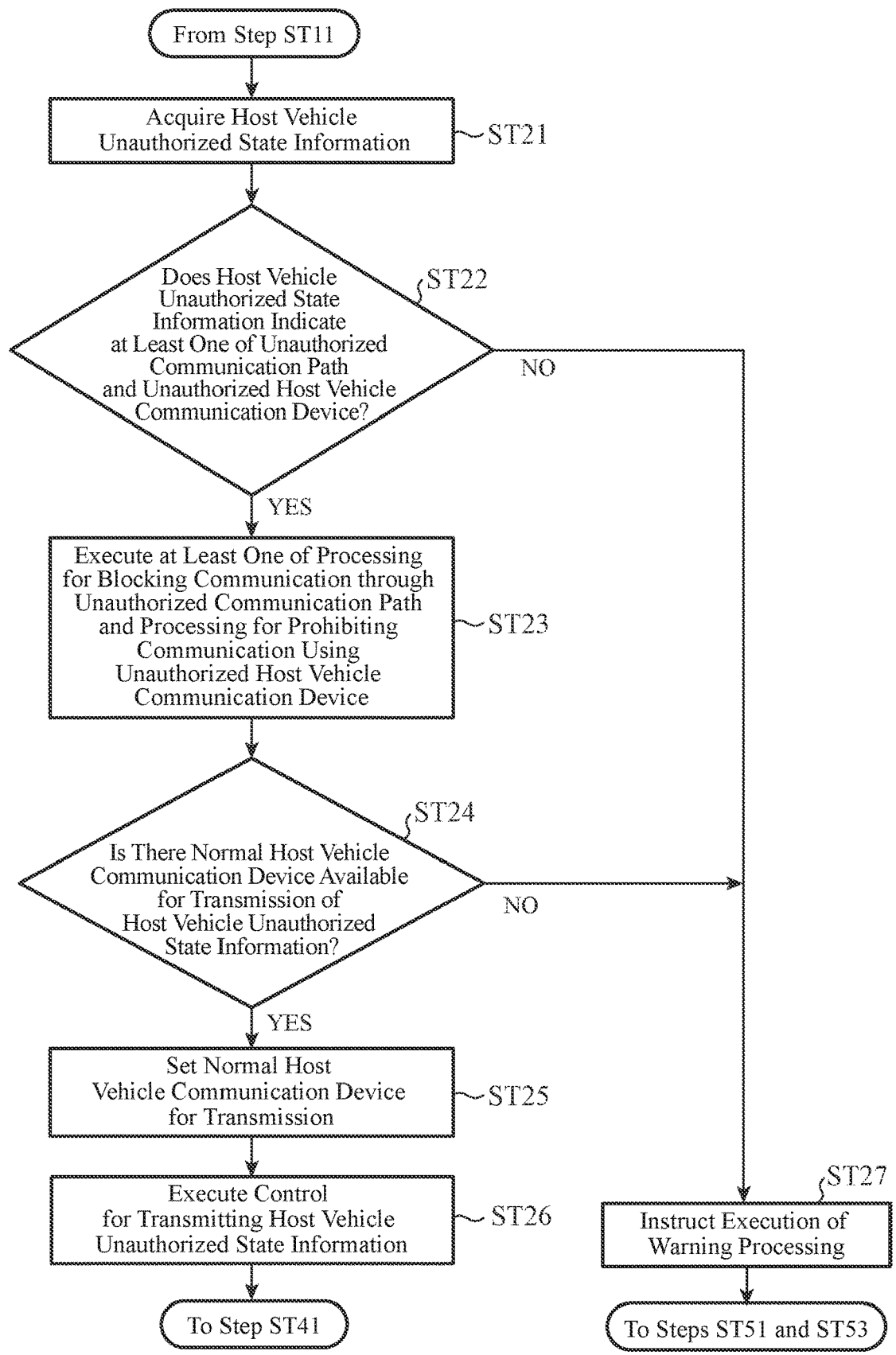
FIG. 8B is a flowchart illustrating the operation of the communication control device according to the first embodiment of the present invention.
Figure 8C:
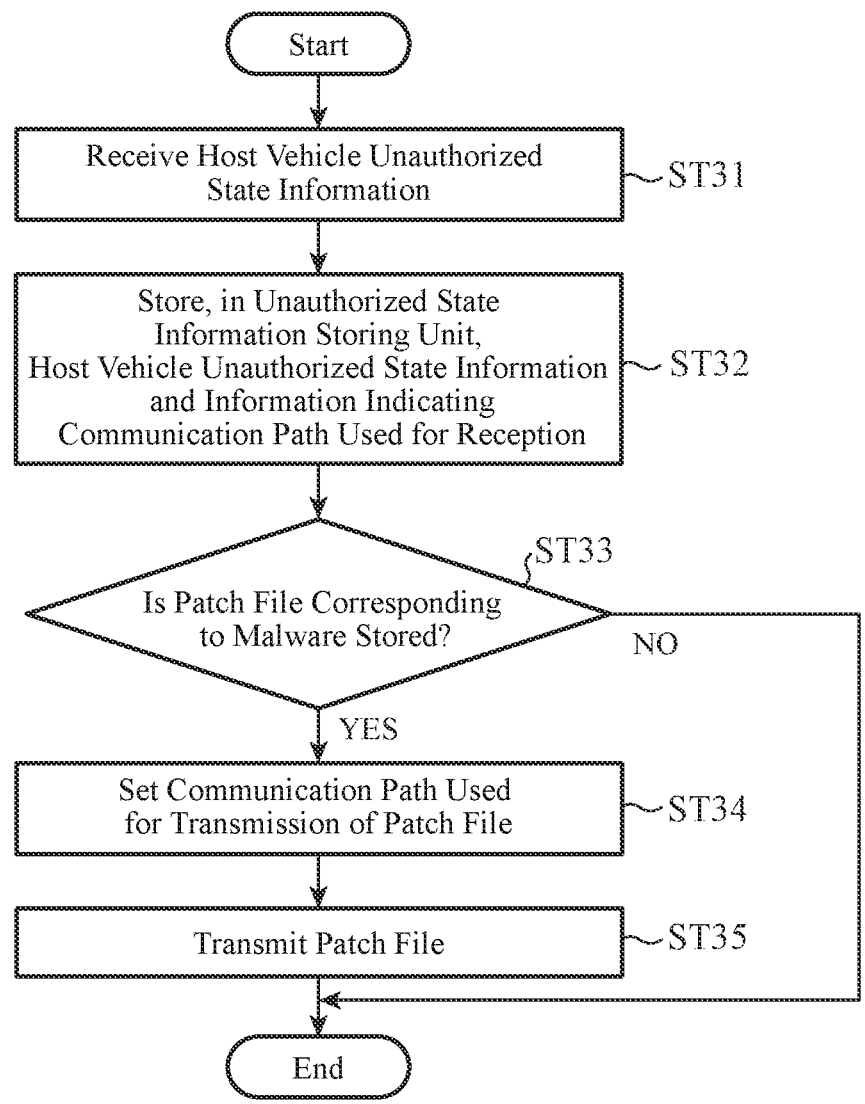
FIG. 8C is a flowchart illustrating the operation of the server device according to the first embodiment of the present invention.
Figure 8D:
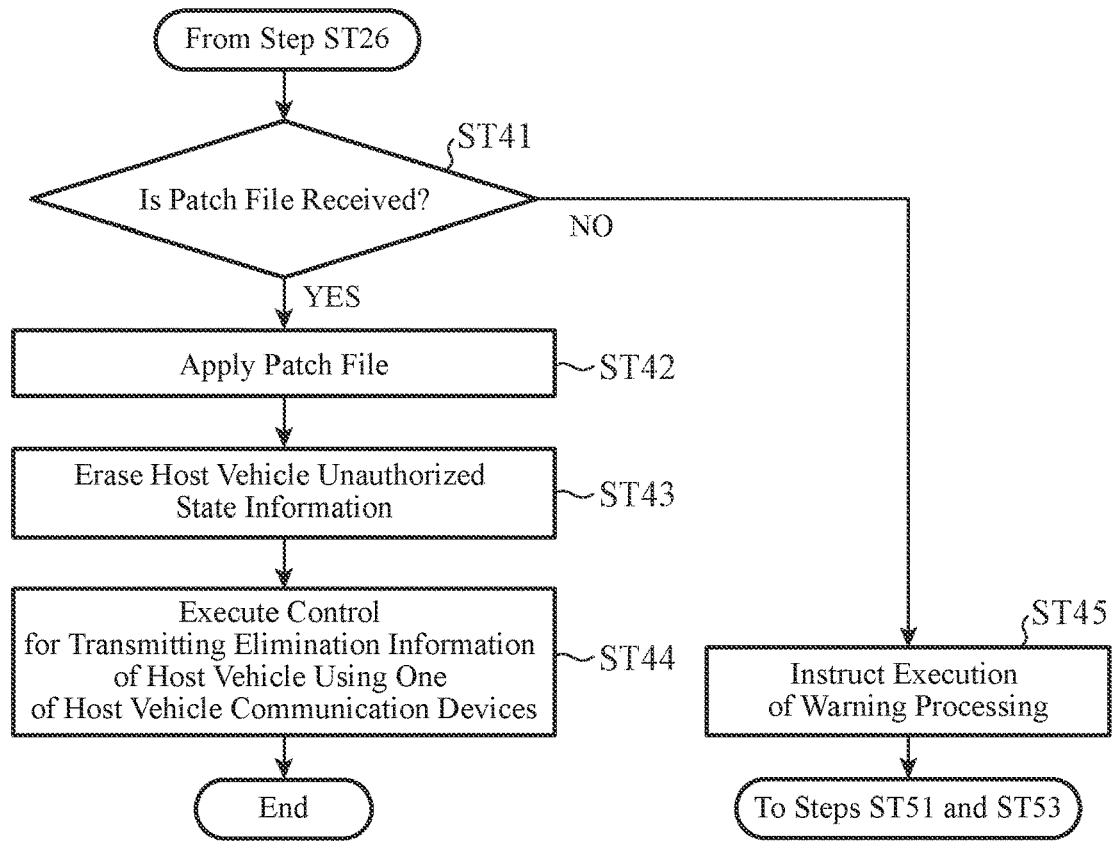
FIG. 8D is a flowchart illustrating the operation of the communication control device according to the first embodiment of the present invention.

Next, with reference to a flowchart of FIG. 8, the operation of the communication control device 20 and the server device 8 will be described focusing on the operation when an unauthorized state occurs in the host vehicle 1. FIGS. 8A, 8B, 8D, and 8E are diagrams illustrating the operation of the communication control device 20, and FIG. 8C is a diagram illustrating the operation of the server device 8. It is assumed that the unauthorized state detecting unit 22 detects malware infection of the information device 11 or other units as an unauthorized state.

In the initial state, the communication control unit 21 executes control for downloading software such as application software or device driver software for the information device 11 by using the host vehicle communication device $10_1$. When downloading of the software is completed, the unauthorized state detecting unit 22 executes processing of steps ST1 and ST2.

In steps ST1 and ST2, the unauthorized state detecting unit 22 executes malware infection check by pattern matching on the downloaded software. For the malware pattern for checking, for example, one stored in advance in the unauthorized state detecting unit 22 is used.

If malware is detected by the malware infection check (step ST2 "YES"), in step ST3, the unauthorized state detecting unit 22 writes host vehicle unauthorized state information into the unauthorized state information storing unit 15. The host vehicle unauthorized state information at this time indicates, for example, that a communication path outside the vehicle including the host vehicle communication device $10_1$ is included in the unauthorized communication path, that the host vehicle communication device $10_1$ is the unauthorized host vehicle communication device, that the content of the unauthorized state is malware infection of the information device 11, that the grounds for detection of the unauthorized state is the malware infection check by the unauthorized state detecting unit 22, and so on.

If no malware is detected by the malware infection check (step ST2 "NO"), or after step ST3, the unauthorized state detecting unit 22 acquires traffic information related to the communication in the host vehicle 1 in step ST4. This traffic information is generated and stored in real time by the communication control unit 21 during communication, for example.

Next, in step ST5, the unauthorized state detecting unit 22 determines whether the communication state in the host vehicle 1 after the software download is abnormal by using the traffic information. For example, in a case where a communication load is abnormally increased as compared to the normal state (such as that signals of 100 commands are transmitted and received in one second, compared with a normal time when signals of ten commands are transmitted/received in one second), the unauthorized state detecting unit 22 determines that the communication state is abnormal. Also in a case where the number of communication errors increases as compared to the normal state and the number of retries for each communication error increases (such as that communication errors occur frequently and five or more retries occur for each communication error, compared with a normal time when communication is established with one retry for one communication error), the unauthorized state detecting unit 22 determines that the communication state is abnormal.

If the communication state is abnormal (step ST5 "YES"), the unauthorized state detecting unit 22 determines that a device in the host vehicle 1 (such as the information device 11, the communication control unit 21, or the host vehicle communication device $10_1$) is infected with malware and writes host vehicle unauthorized state information in the unauthorized state information storing unit 15 in step ST6. The host vehicle unauthorized state information in this case indicates, for example, that a communication path in the host vehicle 1 is included in the unauthorized communication path, that the content of the unauthorized state is malware infection of the information device 11, the communication control unit 21, the host vehicle communication device $10_1$, or other units, that the grounds for detection of the unauthorized state is the abnormality of the communication state in the host vehicle 1, and so on. Note that, at the time of writing the host vehicle unauthorized state information in step ST6, if the host vehicle unauthorized state information written in step ST3 has already been stored, the unauthorized state detecting unit 22 may write only the difference between the two pieces of host vehicle unauthorized state information and thereby update the host vehicle unauthorized state information in the unauthorized state information storing unit 15.

If the communication state is normal (step ST5 "NO"), or after step ST6, the unauthorized state detecting unit 22 executes processing to acquire information indicating that the information device 11 is infected with malware from the information device 11 in step ST7. For example, in a case where the information device 11 has a malware infection checking function independent of the unauthorized state detecting unit 22, the unauthorized state detecting unit 22 executes processing for acquiring the result of the malware infection check.

If the information indicating malware infection is acquired as a result of the processing of step ST7 (step ST8 "YES"), the unauthorized state detecting unit 22 writes the host vehicle unauthorized state information to the unauthorized state information storing unit 15 in step ST9. The host vehicle unauthorized state information at this time indicates, for example, that the content of the unauthorized state is malware infection of the information device 11, that the grounds for the detection of the unauthorized state is the information acquired from the information device 11, and so on. Note that, at the time of writing the host vehicle unauthorized state information in step ST9, if the host vehicle unauthorized state information written in step ST3 or ST6 has already been stored, the unauthorized state detecting unit 22 may write only the difference between the two pieces of host vehicle unauthorized state information and thereby update the host vehicle unauthorized state information in the unauthorized state information storing unit 15.

If information indicating malware infection is not acquired (step ST8 "NO"), or after step ST9, in step ST10, the unauthorized state detecting unit 22 determines whether host vehicle unauthorized state information has been written in at least one of the steps ST3, ST6, and ST9. If host vehicle unauthorized state information has not been written in any of the steps ST3, ST6, and ST9 (step ST10 "NO"), the unauthorized state detecting unit 22 terminates the processing. On the other hand, if host vehicle unauthorized state information has been written in at least one of the steps ST3, ST6, and ST9 (step ST10 "YES"), the unauthorized state detecting unit 22 notifies the communication control unit 21 of that fact in step ST11.

After receiving the notification from the unauthorized state detecting unit 22, the communication control unit 21 acquires the host vehicle unauthorized state information stored in the unauthorized state information storing unit 15 in step ST21. Then in step ST22, the communication control unit 21 determines whether the host vehicle unauthorized state information acquired in step ST21 indicates at least one of an unauthorized communication path or an unauthorized host vehicle communication device.

If the host vehicle unauthorized state information indicates neither the unauthorized communication path nor the unauthorized host vehicle communication device (step ST22 "NO"), the communication control unit 21 instructs the warning control unit 24 to execute warning processing in step ST27.

On the other hand, if the host vehicle unauthorized state information indicates at least one of an unauthorized communication path or an unauthorized host vehicle communication device (step ST22 "YES"), in step ST23, the communication control unit 21 executes at least one of processing for blocking communication through the unauthorized communication path or processing for prohibiting communication using the unauthorized host vehicle communication device. In other words, if the host vehicle unauthorized state information indicates both an unauthorized communication path and an unauthorized host vehicle communication device, the communication control unit 21 executes both the processing for blocking communication through the unauthorized communication path and the processing for prohibiting communication using the unauthorized host vehicle communication device. If the host vehicle unauthorized state information indicates no unauthorized host vehicle communication device, the communication control unit 21 executes only the processing for blocking communication through the unauthorized communication path. Alternatively, if the host vehicle unauthorized state information indicates no unauthorized communication path, the communication control unit 21 executes only the processing for prohibiting communication using the unauthorized host vehicle communication device. If the content of the unauthorized state is an unauthorized access, a provisional countermeasure against the unauthorized access completes by the processing of step ST23.

Next in step ST24, the communication control unit 21 determines whether there is a normal host vehicle communication device available for transmission of the host vehicle unauthorized state information. If there is no normal host vehicle communication device available for transmission of the host vehicle unauthorized state information (step ST24 "NO"), for example when all the normal host vehicle communication devices are outside the communication service area, the communication control unit 21 instructs the warning control unit 24 to execute the warning processing in step ST27.

On the other hand, if there is a normal host vehicle communication device available for transmission of the host vehicle unauthorized state information (step ST24 "YES"), the communication control unit 21 sets a normal host vehicle communication device to be used for transmission of the host vehicle unauthorized state information in step ST25. Specifically, for example, the communication control unit 21 sets all the normal host vehicle communication devices available for transmission of the host vehicle unauthorized state information as normal host vehicle communication devices for transmission.

Next, in step ST26, the communication control unit 21 executes control for transmitting the host vehicle unauthorized state information by using a normal host vehicle communication device set in step ST25.

For example when the host vehicle communication device 10$_1$ is set as a normal host vehicle communication device for transmission in step ST25, the host vehicle communication device 10$_1$ communicates with the base station (not illustrated) and transmits host vehicle unauthorized state information to the server device 8 via the Internet 3 in the processing of step ST26.

Alternatively, when the host vehicle communication device 10$_2$ is set as the normal host vehicle communication device for transmission in step ST25, the host vehicle communication device 10$_2$ transmits the host vehicle unauthorized state information to the communication device 4$_2$ for inter-vehicle communication provided in the other vehicle 4. The communication control device provided in the other vehicle 4 executes control for transmitting the host vehicle unauthorized state information to the server device 8 via the Internet 3 by using the communication device 4₁ for Internet connection.

When the host vehicle communication device 10₃ is set as the normal host vehicle communication device for transmission in step ST25, the host vehicle communication device 10₃ transmits the host vehicle unauthorized state information to the communication device 5₁ provided in the road infrastructure 5. The communication device 5₁ transmits the host vehicle unauthorized state information to the server device 8 via the Internet 3.

Alternatively, when the host vehicle communication device 10₄ is set as the normal host vehicle communication device for transmission in step ST25, the host vehicle communication device 10₄ transmits the host vehicle unauthorized state information to the communication device 6₁ held by the pedestrian 6. The communication device 6₁ transmits the host vehicle unauthorized state information to the server device 8 via the Internet 3.

When the host vehicle communication device 10₅ is set as the normal host vehicle communication device for transmission in step ST25, the host vehicle communication device 10₅ transmits the host vehicle unauthorized state information to the communication device 7₁ provided in the charger 7. The communication device 7₁ transmits the host vehicle unauthorized state information to the server device 8 via the Internet 3.

Subsequently, in step ST31, the reception unit 31 of the server device 8 receives the host vehicle unauthorized state information from at least one of the communication devices 4₁, 5₁, 6₁, 7₁, 10₁ via the Internet 3 through one of the above communication paths. Next, in step ST32, the information writing unit 34 causes the unauthorized state information storing unit 36 to store the host vehicle unauthorized state information received in step ST31. At this time, the information writing unit 34 causes the unauthorized state information storing unit 36 to store information indicating the communication path used for reception of the host vehicle unauthorized state information together with the host vehicle unauthorized state information.

Subsequently, in step ST33, the information reading unit 35 reads the host vehicle unauthorized state information stored in the unauthorized state information storing unit 36 in step ST32 and determines whether a security patch file corresponding to the content of the unauthorized state, that is, malware, indicated by the host vehicle unauthorized state information is stored in the patch file storing unit 37. When the patch file is stored in the patch file storing unit 37, the information reading unit 35 reads the patch file and outputs the patch file to the transmission unit 32. At this time, the information reading unit 35 reads the information indicating the communication path used for reception of the host vehicle unauthorized state information stored in the unauthorized state information storing unit 36 in step ST32 together with the patch file and outputs the information to the transmission unit 32.

Then in step ST34, the transmission unit 32 sets a communication path to be used for transmission of the patch file. Specifically, for example, the transmission unit 32 sets the communication path used for transmission of the patch file to the same path as the communication path used for reception of the host vehicle unauthorized state information.

In other words, the transmission path of the patch file is normally a path leading to the host vehicle communication device 10₁ of the host vehicle 1 via the Internet 3. However, for example, in a case where the host vehicle communication device 10₁ is an unauthorized host vehicle communication device, since communication using the host vehicle communication device 10₁ is prohibited in step ST23 of FIG. 8B, there is a problem in that the host vehicle 1 cannot receive the patch file through that path. On the other hand, by setting the communication path used for transmission of the patch file to the same path as the communication path used for reception of the host vehicle unauthorized state information, regardless of which one of the host vehicle communication devices 10₁ to 10₅ is the unauthorized host vehicle communication device, the host vehicle 1 can receive the patch file using a normal host vehicle communication device.

Next, in step ST35, the transmission unit 32 transmits the patch file by the communication path set in step ST34.

Note that if no patch file corresponding to the content of the unauthorized state indicated by the host vehicle unauthorized state information is stored in the patch file storing unit 37 ("NO" in step ST33), the server device 8 terminates the processing without executing the processing of steps ST34 and ST35.

Next, in step ST41, the communication control unit 21 of the host vehicle 1 determines whether the normal host vehicle communication device has received the patch file. If the patch file is received (step ST41 "YES"), the communication control unit 21 outputs the patch file to the unauthorized state eliminating unit 23.

Next, in step ST42, the unauthorized state eliminating unit 23 eliminates the unauthorized state by applying the patch file. As a result, the malware infected the information device 11 or other units is removed. When application of the patch file is completed, the unauthorized state eliminating unit 23 notifies the communication control unit 21 of that fact. In addition, in step ST43, the unauthorized state eliminating unit 23 erases the host vehicle unauthorized state information corresponding to the patch file applied in step ST42 from the host vehicle unauthorized state information stored in the unauthorized state information storing unit 15.

Next, in step ST44, the communication control unit 21 executes control for transmitting host vehicle elimination information indicating that the malware has been removed by application of the patch file using one of the host vehicle communication devices 10₁ to 10₅. Note that in the case where the content of the unauthorized state is an unauthorized access, the communication control unit 21 executes control for transmitting host vehicle elimination information indicating that a permanent countermeasure against the unauthorized access has completed by application of the patch file.

By the processing of step ST44, the host vehicle elimination information is transmitted to the server device 8 via the Internet 3 by any one of the communication paths described as the communication path for transmission of the host vehicle unauthorized state information. In the server device 8, when the reception unit 31 receives the host vehicle elimination information, the information writing unit 34 erases the host vehicle unauthorized state information corresponding to the host vehicle elimination information from the unauthorized state information storing unit 36.

Note that if the normal host vehicle communication device does not receive the patch file (step ST41 "NO"), for example in the case where the server device 8 has not transmitted the patch file in the processing of FIG. 8C, the communication control device 20 does not execute the processing of steps ST42 to ST44. In this case, in step ST45, the communication control unit 21 instructs the warning control unit 24 to execute the warning processing.

Upon receiving the instruction of step ST27 or step ST45, the warning control unit 24 executes warning processing.

That is, in step ST51, the warning control unit 24 generates image data indicating that an unauthorized state has occurred, that is, that the information device 11 or other units are infected with malware depending on the content of the host vehicle unauthorized state information stored in the unauthorized state information storing unit 15. Next, in step ST52, the warning control unit 24 outputs the image data to the display device 12 and causes the display device 12 to display a warning image corresponding to the image data.

For example, it is assumed that neither an unauthorized communication path nor an unauthorized host vehicle communication device has been identified when malware infection of the information device 11 or other units has been detected, and that due to "NO" in the step ST22, the warning control unit 24 causes the warning image to be displayed by instruction of step ST27. The warning image in this case is, for example, an image including characters or icons indicating that malware infection has occurred, that the infection path cannot be identified, that it is recommended to bring the host vehicle 1 to a dealer or the like for removal of the malware, and so on.

Furthermore, for example, it is assumed that all the normal host vehicle communication devices are outside the communication service area and that the warning control unit 24 causes the warning image to be displayed by the instruction in step ST27 due to "NO" in step ST24. The warning image in this case is an image including characters or icons indicating that the malware infection has occurred via an unauthorized communication path, that it is recommended to move the host vehicle 1 to a communication service area of one of the normal host vehicle communication devices for reception of the patch file, and so on.

Alternatively, for example, it is assumed that the host vehicle unauthorized state information has been transmitted but the patch file cannot be received and that, due to "NO" in step ST41, the warning control unit 24 causes a warning image to be displayed by the instruction in step ST45. The warning image in this case is an image including characters or icons indicating that malware infection has occurred via an unauthorized communication path, that it is recommended to bring the host vehicle 1 to a dealer or the like for removal of the malware, and so on.

Such warning images are displayed, for example, in a form of a so-called "pop-up" superimposed on a normal screen displayed on the display device 12 by the information device 11 or other units.

Moreover, in step ST53, the warning control unit 24 generates audio data indicating that the unauthorized state has occurred, that is, that the information device 11 or other units are infected with malware depending on the content of the host vehicle unauthorized state information stored in the unauthorized state information storing unit 15. Next, in step ST54, the warning control unit 24 outputs the audio data to the audio output device 13 and causes the audio output device 13 to output warning sound corresponding to the audio data. Since the specific content of the warning sound is similar to that of the warning image, description thereof will be omitted.

Next, with reference to a flowchart in FIG. 9, the operation of the communication control device 20 will be described with a focus on processing for blocking communication with the unauthorized other vehicle communication device in the case where an unauthorized state has occurred in the other vehicle 4. The communication control unit 21 executes processing of step ST61 at predetermined time intervals when initiating communication with the other vehicle 4 or during communication with the other vehicle 4.

First, in step ST61, the communication control unit 21 determines whether an unauthorized state has occurred in the other vehicle 4 to be communicated with.

Specifically, for example, the communication control unit 21 communicates with the server device 8 using the host vehicle communication device $10_1$ for Internet connection and inquires whether other vehicle unauthorized state information related to the other vehicle 4 is stored in the unauthorized state information storing unit 36. The server device 8 transmits an inquiry result to the host vehicle 1 and transmits the other vehicle unauthorized state information to the host vehicle 1 when the unauthorized state information related to the other vehicle 4 is stored in the unauthorized state information storing unit 36. Using the received inquiry result, the communication control unit 21 determines whether an unauthorized state has occurred in the other vehicle 4 to be communicated with.

If an unauthorized state has occurred in the other vehicle 4 ("YES" in step ST61), the communication control unit 21 determines in step ST62 whether the other vehicle unauthorized state information received in step ST61 indicates the unauthorized other vehicle communication device.

If the other car unauthorized state information indicates the unauthorized other vehicle communication device ("YES" in step ST62), the communication control unit 21 blocks communication between the host vehicle communication devices $10_1$ to $10_5$ and the unauthorized other vehicle communication device in step ST63. Specifically, for example, the communication control unit 21 filters an IP address, a MAC address, or the like assigned to the unauthorized other vehicle communication device. After the processing of step ST63, the communication path in the communication between the host vehicle 1 and the other vehicle 4 does not go through the unauthorized other vehicle communication device, that is, avoids the unauthorized communication path in the other vehicle 4. On the other hand, if the other vehicle unauthorized state information does not indicate the unauthorized other vehicle communication device ("NO" in step ST62), the communication control unit 21 terminates the processing.

If no unauthorized state has occurred in the other vehicle 4 ("NO" in step ST61), in step ST64, the communication control unit 21 determines whether there is a communication device of the other vehicle for which the communication with the host vehicle communication devices $10_1$ to $10_5$ is being blocked (that is, an unauthorized other vehicle communication device that is set as a blockage target in the previous step ST63). If there is a communication device of the other vehicle for which the communication is being blocked ("YES" in step ST64), the communication control unit 21 cancels communication blockage between the host vehicle communication devices $10_1$ to $10_5$ and the unauthorized other vehicle communication device in step ST65. On the other hand, if there is no other vehicle communication device for which the communication is being blocked ("NO" in step ST64), the communication control unit 21 terminates the processing.

Note that, when setting the normal host vehicle communication device available for transmission of the host vehicle unauthorized state information (step ST25 in FIG. 8B), the communication control unit 21 may refer to the presence or absence of the communication blockage set in step ST63. That is, in a case where an unauthorized other vehicle communication device whose communication is blocked is included in a communication path between any one of the normal host vehicle communication devices and the server device 8, the communication control unit 21 may exclude the normal host vehicle communication device from the normal host vehicle communication devices for transmission.

Figure 10:
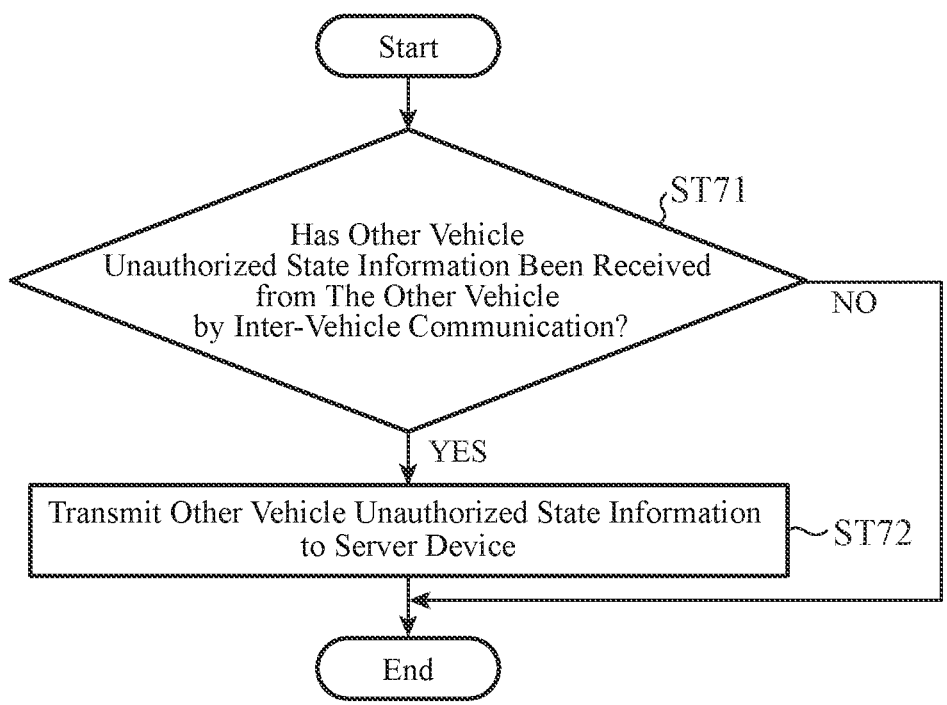
FIG. 10 is a flowchart illustrating still another operation of the communication control device according to the first embodiment of the present invention.

Next, with reference to FIG. 10, the operation of the communication control device 20 will be described with a focus on the operation to transfer, to the server device 8, other vehicle unauthorized state information received by inter-vehicle communication.

First, in step ST71, the communication control unit 21 determines whether the host vehicle communication device $10_2$ has received other vehicle unauthorized state information related to the other vehicle 4 from the other vehicle communication device $4_2$ by inter-vehicle communication.

If other vehicle unauthorized state information has been received by inter-vehicle communication ("YES" in step ST71), in step ST72, the communication control unit 21 executes control for transmitting the other vehicle unauthorized state information having been received in step ST71 to the server device 8 by using the host vehicle communication device $10_1$ for Internet connection. On the other hand, if other vehicle unauthorized state information has not been received by inter-vehicle communication (step ST71 "NO"), the communication control unit 21 terminates the processing.

In this manner, when an unauthorized state occurs due to communication using an unauthorized host vehicle communication device out of the plurality of host vehicle communication devices $10_1$ to $10_5$, the communication control device 20 according to the first embodiment executes control for transmitting host vehicle unauthorized state information by using a normal host vehicle communication device that is different from the unauthorized host vehicle communication device. Transmission of the host vehicle unauthorized state information allows the host vehicle unauthorized state information to be used for protection against the unauthorized state in the other vehicle 4 or the like. Moreover, by using the normal host vehicle communication device for transmission of the host vehicle unauthorized state information, it is possible to prevent the unauthorized communication path from being used for transmission of the host vehicle unauthorized state information and prevent spread of malware infection at the destination of the host vehicle unauthorized state information.

Note that the content of the unauthorized state information is not limited to an unauthorized communication path, an unauthorized host vehicle communication device or an unauthorized other vehicle communication device, the content of the unauthorized state, or the grounds for the detection of occurrence of the unauthorized state. In addition to these contents, the unauthorized state information may indicate an identifier assigned to the vehicle in which the unauthorized state has occurred, a date and time when occurrence of the unauthorized state has been detected, the position of the vehicle when the occurrence of the unauthorized state has been detected, etc.

In the case where the unauthorized state information indicates the date and time, for example, the server device 8 may erase, from the unauthorized state information storing unit 36, unauthorized state information with outdated dates from those stored in the unauthorized state information storing unit 36 even when elimination information thereof has not been received. As a result, the amount of data of unauthorized state information in the storage device 33 can be reduced.

Moreover, the server device 8 may transmit a patch file for the host vehicle unauthorized state information to the other vehicle 4 in addition to the host vehicle 1. Furthermore, in the case where the unauthorized state information indicates the date and time and the position, when there are a plurality of other vehicles 4, the server device 8 may set another vehicle 4 to which the patch file is transmitted depending on the position.

Specifically, for example, the server device 8 has a function of accumulating and storing position information of each vehicle communicatively via the Internet 3 in cooperation with the global positioning system (GPS). The server device 8 sets, as a destination of the patch file, another vehicle 4 located in a region of a predetermined range centered at the position of the host vehicle 1 indicated by the host vehicle unauthorized state information as of the date and time indicated by the host vehicle unauthorized state information. The predetermined range at this time may be, for example, a simple round range. Alternatively, from the viewpoint of preventing spread of infection by containment of malware, a donut-like range may be first set, and then ranges may be sequentially set such that the radius of the donut-shape is gradually narrowed.

Moreover, the communication control unit 21 may execute control for receiving other vehicle unauthorized state information from the server device 8 for example at predetermined time intervals using the host vehicle communication devices $10_1$ to $10_5$ and cause the unauthorized state information storing unit 15 to store the other vehicle unauthorized state information. In other words, the unauthorized state information storing unit 15 in the host vehicle 1 may store the other vehicle unauthorized state information in addition to the host vehicle unauthorized state information.

Figure 9:
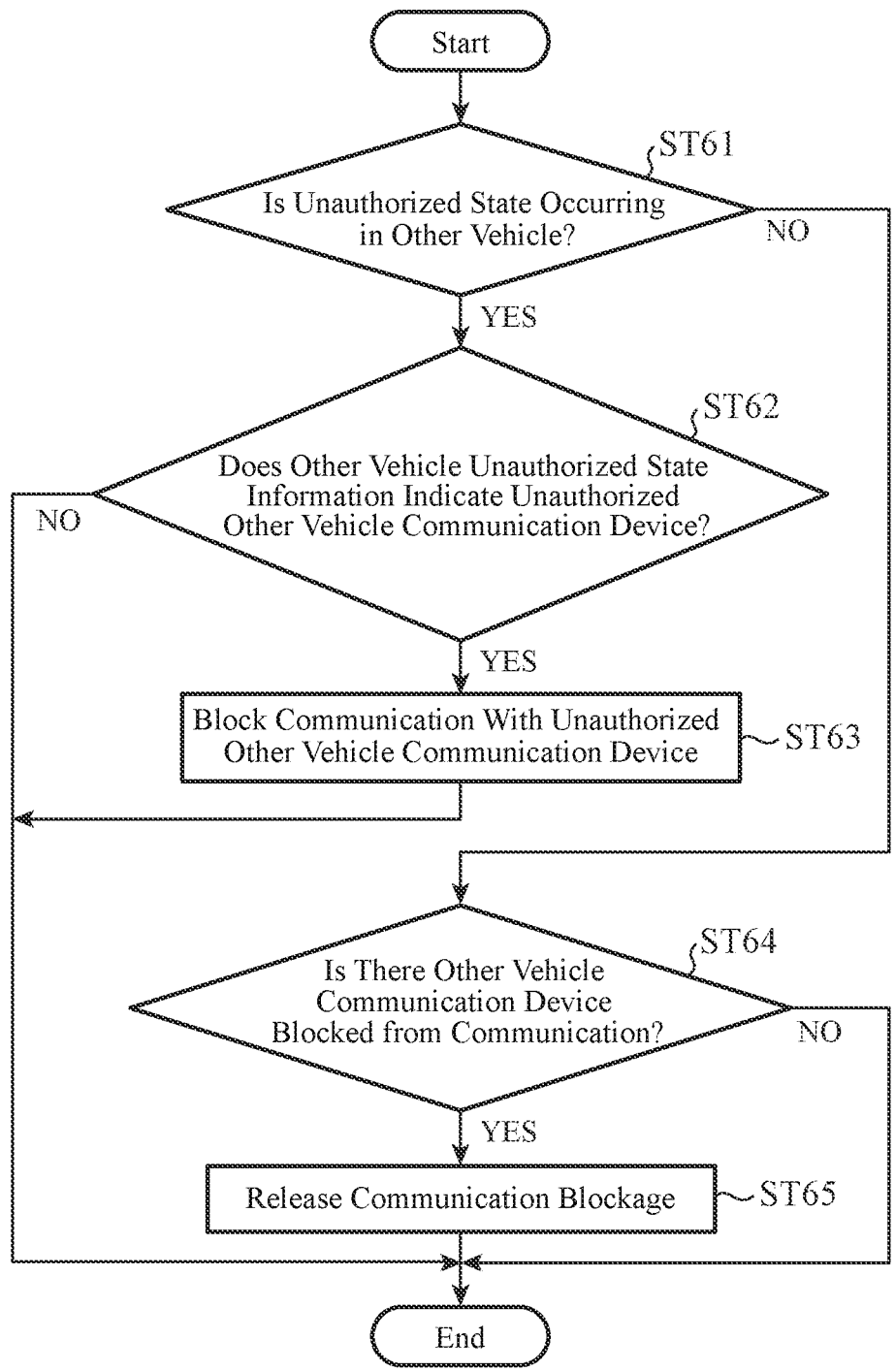
FIG. 9 is a flowchart illustrating another operation of the communication control device according to the first embodiment of the present invention.

In this case, in step ST61 of FIG. 9, the communication control unit 21 may use the other vehicle unauthorized state information stored in the unauthorized state information storing unit 15 instead of referring to the server device 8 for whether there is other vehicle unauthorized state information to determine whether an unauthorized state has occurred in the other vehicle 4 to be communicated with. Moreover, in step ST62 of FIG. 9, the communication control unit 21 may determine whether the other vehicle unauthorized state information stored in the unauthorized state information storing unit 15, instead of the other vehicle unauthorized state information received from the server device 8, indicates an unauthorized other vehicle communication device.

Furthermore, in this case, the communication control unit 21 may execute control for receiving the other vehicle unauthorized state information stored in the unauthorized state information storing unit 15 of the other vehicle 4 by using the host vehicle communication device $10_2$ for inter-vehicle communication and cause the unauthorized state information storing unit 15 of the host vehicle 1 to store the received other vehicle unauthorized state information. As a result, for example, even when the host vehicle 1 cannot communicate with the server device 8, the host vehicle 1 can acquire or update the other vehicle unauthorized state information to determine whether an unauthorized state has occurred in the other vehicle 4 which the host vehicle 1 is going to pass by in the near future (step ST61 in FIG. 9) and thereby execute in advance a countermeasure such as blocking communication.

In this manner, with the system configuration in which unauthorized state information related to each vehicle is stored in a storage device 14 of each vehicle in addition to the storage device 33 of the server device 8, the data communication amount in the processing of step ST61 can be reduced. On the other hand, with the system configuration in which unauthorized state information related to each vehicle is stored only in the storage device 33 of the server device 8, the data capacity of unauthorized state information in a storage device 14 of each vehicle can be reduced.

Moreover, patch files may be stored in a storage device 14 of each vehicle in addition to the storage device 33 of the server device 8. That is, the communication control unit 21 of the host vehicle 1 may execute control for receiving patch files stored in the patch file storing unit 37 of the server device 8 by using the host vehicle communication device 10$_1$ for Internet connection and store the received patch files in the storage device 14 of the host vehicle 1. In this case, in step ST41 of FIG. 8D, instead of determining whether the normal host vehicle communication device has received a patch file, the communication control unit 21 of the host vehicle 1 determines whether a patch file corresponding to the unauthorized state in the host vehicle 1 is stored in the storage device 14 of the host vehicle 1. If the patch file is stored, the communication control unit 21 outputs the patch file to the unauthorized state eliminating unit 23.

Furthermore, in this case, the communication control unit 21 of the host vehicle 1 may execute control for receiving patch files stored in the storage device 14 of the other vehicle 4 using the host vehicle communication device 10$_2$ for inter-vehicle communication and store the received patch files in the storage device 14 of the host vehicle 1. With this configuration, for example even when the host vehicle 1 cannot communicate with the server device 8, the host vehicle 1 can acquire or update the patch files therein and eliminate the unauthorized state.

Moreover, in the case where an unauthorized state has occurred in the other vehicle 4 ("YES" in step ST61), the communication control unit 21 may instruct the warning control unit 24 to execute the warning processing, and the warning control unit 24 may execute control for causing the display device 12 to display a warning image indicating that the unauthorized state has occurred in the other vehicle 4 or control for causing the audio output device 13 to output warning sound indicating that the unauthorized state has occurred in the other vehicle 4.

Furthermore, in this case, in the case where the other vehicle unauthorized state information indicates the position of the other vehicle 4 at the time of detection of the unauthorized state, the warning image may be displayed such that an icon image corresponding to the other vehicle 4 at that position is superimposed on a map image. Furthermore, in the case where the current position of the other vehicle 4 can be acquired from the server device 8 or other units, the warning image may be displayed such that an icon image corresponding to the other vehicle 4 at that position is superimposed on a map image. Alternatively, in the case where the display device 12 is a head-up display (HUD) and the current position of the other vehicle 4 is positioned within a viewing distance ahead of the host vehicle 1, the HUD may project such an image that emphasizes the other vehicle 4 onto the windshield of the host vehicle 1.

Furthermore, when receiving elimination information from each vehicle, the server device 8 may, instead of erasing unauthorized state information corresponding to the elimination information from the unauthorized state information storing unit 36, store information indicating that the unauthorized state corresponding to the unauthorized state information has been eliminated in the unauthorized state information storing unit 36. As a result, in the unauthorized state information storing unit 36, history data related to occurrence and elimination of unauthorized states in each vehicle is stored. This history data can be used for various types of processing such as analysis of malware or an unauthorized access and creation of a new patch file.

Similarly, in the system configuration in which the unauthorized state information storing unit 15 of the host vehicle 1 stores other vehicle unauthorized state information, when receiving other vehicle elimination information from the server device 8, the communication control unit 21 may, instead of erasing other vehicle unauthorized state information corresponding to the elimination information from the unauthorized state information storing unit 15, causing the unauthorized state information storing unit 15 to store information indicating that the unauthorized state corresponding to the other vehicle unauthorized state information has been eliminated. That is, the communication system 100 may have a system configuration in which history data is stored in each vehicle.

Figure 8E:
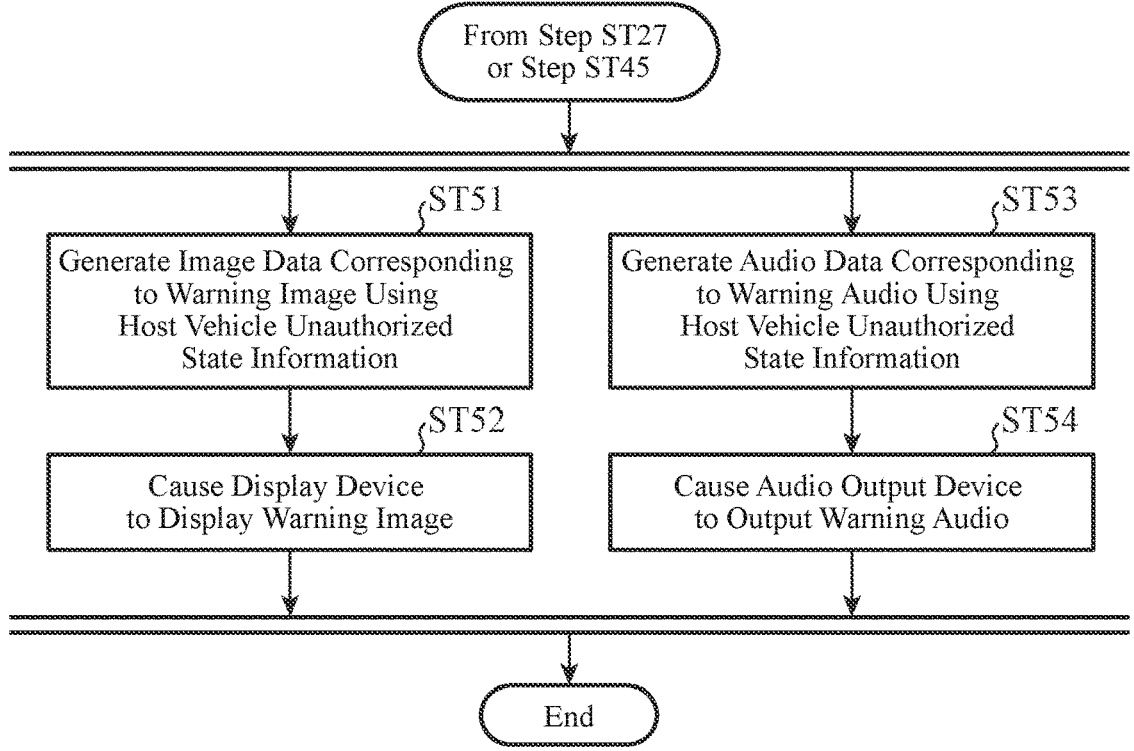
FIG. 8E is a flowchart illustrating the operation of the communication control device according to the first embodiment of the present invention.

In addition, the warning control unit 24 may execute only one of the processing for generating an image data and causing the display device 12 to display a warning image (steps ST51 and ST52 in FIG. 8E) and the processing for generating audio data and causing the audio output device 13 to output warning sound (steps ST53 and ST54 in FIG. 8E).

In FIG. 1 the example in which the communication control device 20 includes the gateway device which is a separate member from the host vehicle communication device 10$_1$ and the information device 11, however, a part or all of the communication control device 20 may be integrally configured with the host vehicle communication device 10$_1$ or the information device 11. Specifically, for example, some of the functions of the communication control device 20 may be implemented by the gateway device, and the remaining functions may be implemented by a mobile phone terminal that is the host vehicle communication device 10$_1$. Alternatively, for example, some of the functions of the communication control device 20 may be implemented by the gateway device, and the remaining functions may be implemented by a multimedia device that is the information device 11.

Furthermore, the host vehicle 1 is only required to have a plurality of communication devices including different direct communication objects (that is, communication paths with the Internet 3 are different), and thus the host vehicle communication devices are not limited to the five host vehicle communication devices 10$_1$ to 10$_5$ exemplified in FIG. 1. Any number of host vehicle communication devices may be used, and communication objects of each vehicle communication device may be anything based on V2X. In addition, there may be two or more host vehicle communication devices that directly communicate with the same communication object.

As described above, the communication control device 20 of the first embodiment is for the host vehicle 1 including the plurality of host vehicle communication devices 10$_1$ to 10$_5$ each including a different communication object. The communication control device 20 includes: the unauthorized state detecting unit 22 for detecting an unauthorized state occurring from communication using an unauthorized host vehicle communication device out of the plurality of host vehicle communication devices 10$_1$ to 10$_5$; and the communication control unit 21 for executing control for transmitting host vehicle unauthorized state information related to the unauthorized state by using a normal host vehicle communication device out of the plurality of host vehicle communication devices 10$_1$ to 10$_5$ excluding the unauthorized host vehicle communication device when the unauthorized state is detected. By transmitting the host vehicle unauthorized state information, the detection result of the unauthorized state in the host vehicle 1 can be used for protection from an unauthorized state in the other vehicle 4. Moreover, by using the normal host vehicle communication device for transmission of the host vehicle unauthorized state information, it is possible to prevent the unauthorized communication path from being used for transmission of the host vehicle unauthorized state information and prevent spread of malware infection at the destination of the host vehicle unauthorized state information.

Furthermore, in a case where there is a plurality of normal host vehicle communication devices, the communication control unit 21 executes control for transmitting the host vehicle unauthorized state information by using all of the normal host vehicle communication devices available for transmission of the host vehicle unauthorized state information. As a result, more communication objects can be notified of the occurrence of the unauthorized state in the host vehicle 1 while the spread of malware infection or the like is prevented, and the probability that the host vehicle unauthorized state information reaches the server device 8 can be enhanced.

Furthermore, when an unauthorized state is detected, the communication control unit 21 prohibits communication using the unauthorized host vehicle communication device. This enables the prevention of spread of malware infection or the like in the other vehicle 4 or other units from communication with the unauthorized host vehicle communication device.

The communication control unit 21 further executes control for receiving a security patch file against the unauthorized state by using the normal host vehicle communication device. As a result, the patch file can be received in a state where communication using the unauthorized host vehicle communication device is prohibited.

Furthermore, the communication control device 20 incudes the unauthorized state eliminating unit 23 for eliminating the unauthorized state by using the patch file, and the communication control unit 21 executes control for transmitting, when the unauthorized state is eliminated, by using any one of the plurality of host vehicle communication devices $10_1$ to $10_5$, host vehicle elimination information indicating that the unauthorized state has been eliminated. In this manner, the unauthorized state can be eliminated, and elimination of the unauthorized state can be notified to the server device 8 or other units.

Moreover, in the case where the unauthorized state has occurred in the other vehicle 4, the communication control unit 21 blocks communication between each of the host vehicle communication devices $10_1$ to $10_5$ and the unauthorized other vehicle communication device used for communication which is a cause of the unauthorized state in the other vehicle 4. This enables prevention of a spread of malware infection in the host vehicle 1 from communication with the unauthorized other vehicle communication device for example when malware infection occurs in the other vehicle 4.

Moreover, the communication system 100 according to the first embodiment includes the communication control device 20 for the host vehicle 1 including the plurality of host vehicle communication devices $10_1$ to $10_5$ each including a different communication object. The communication control device 20 includes: the unauthorized state detecting unit 22 for detecting an unauthorized state occurring from communication using an unauthorized host vehicle communication device out of the plurality of host vehicle communication devices $10_1$ to $10_5$; and the communication control unit 21 for executing control for transmitting host vehicle unauthorized state information related to the unauthorized state by using a normal host vehicle communication device out of the plurality of host vehicle communication devices $10_1$ to $10_5$ excluding the unauthorized host vehicle communication device when the unauthorized state is detected. As a result, effects similar to those of the communication control device 20 can be obtained.

The communication system 100 further includes a server device 8 for transmitting a security patch file against the unauthorized state to the host vehicle 1 when receiving the host vehicle unauthorized state information. As a result, the unauthorized state can be eliminated by using the patch file in the host vehicle 1.

Furthermore, when an unauthorized state is detected, the communication control unit 21 prohibits communication using the unauthorized host vehicle communication device, and the server device 8 sets the communication path used for transmission of the patch file to the same path as the communication path used for reception of the host vehicle unauthorized state information. As a result, by prohibiting communication using the unauthorized host vehicle communication device, the patch file can be received in the host vehicle 1 while the spread of malware infection or the like is prevented.

The server device 8 further transmits the patch file to the host vehicle 1 and the other vehicle 4. As a result, the detection result of the unauthorized state in the host vehicle 1 can be used for elimination or prevention of the unauthorized state in the other vehicle 4.

In addition, the host vehicle unauthorized state information indicates the position of the host vehicle 1, and the server device 8 sets the other vehicle 4 as a destination of the patch file depending on the position indicated by the host vehicle unauthorized state information. By appropriately setting the destination, it is possible to contain malware.

The communication control method according to the first embodiment is for the host vehicle 1 including the plurality of host vehicle communication devices $10_1$ to $10_5$ each including a different communication object. The method includes: a step of detecting, by the unauthorized state detecting unit 22, an unauthorized state occurring from communication using an unauthorized host vehicle communication device out of the plurality of host vehicle communication devices $10_1$ to $10_5$ (steps ST1 to ST11); and a step of executing, by the communication control unit 21, control for transmitting host vehicle unauthorized state information related to the unauthorized state by using a normal host vehicle communication device out of the plurality of host vehicle communication devices $10_1$ to $10_5$ excluding the unauthorized host vehicle communication device when the unauthorized state is detected (step ST26). As a result, effects similar to those of the communication control device 20 can be obtained.

Incidentally, within the scope of the present invention, the present invention may include a modification of any component of the embodiments, or an omission of any component in the embodiments.

INDUSTRIAL APPLICABILITY

A communication control device of the present invention can be used for controlling a communication device for a vehicle compatible with V2X communication based on dedicated short range communications (DSRC), ITS, or the like.

REFERENCE SIGNS LIST

1: Host vehicle, 3: Internet, 4: Other vehicle, $4_1$, $4_2$: Communication device (other vehicle communication device), 5: Road infrastructure, 5₁: Communication device, 6: Pedestrian, 6₁: Communication device, 7: Charger, 7₁: Communication device, 8: Server device, 10₁ to 10₅: Communication device (host vehicle communication device), 11: Information device, 12: Display device, 13: Audio output device, 14: Storage device, 15: Unauthorized state information storing unit, 20: Communication control device, 21: Communication control unit, 22: Unauthorized state detecting unit, 23: Unauthorized state eliminating unit, 24: Warning control unit, 31: Reception unit, 32: Transmission unit, 33: Storage device, 34: Information writing unit, 35: Information reading unit, 36: Unauthorized state information storing unit, 37: Patch file storing unit, 41: Memory, 42: Processor, 43: Processing circuit, 51: Receiver, 52: Transmitter, 53: Memory, 54: Processor, 55: Processing circuit, 100: Communications system

The invention claimed is:

1. A communication control device for a vehicle including a plurality of host vehicle communication devices each including a different communication object, the communication control device comprising:
    an unauthorized state detector to detect an unauthorized state occurring from communication using an unauthorized host vehicle communication device out of the plurality of host vehicle communication devices; and
    a communication controller to execute control for transmitting host vehicle unauthorized state information related to the unauthorized state by using at least one normal host vehicle communication device out of the plurality of host vehicle communication devices excluding the unauthorized host vehicle communication device when the unauthorized state is detected,
    wherein, when the unauthorized state is detected, the communication controller prohibits communication using a direct communication path between the unauthorized host vehicle communication device and an apparatus external to the vehicle, which is otherwise available to the unauthorized host vehicle communication device while operating in an authorized state.

2. The communication control device according to claim 1,
    wherein the plurality of host vehicle communication devices comprises at least two of a communication device for Internet connection, a communication device for inter-vehicle communication, a communication device for road-to-vehicle communication, a communication device for pedestrian-to-vehicle communication, and a communication device for communication with a charger.

3. The communication control device according to claim 1,
    wherein in a case where the at least one normal host vehicle communication device includes a plurality of normal host vehicle communication devices, the communication controller executes control for transmitting the host vehicle unauthorized state information by using all of the normal host vehicle communication devices available for transmission of the host vehicle unauthorized state information.

4. The communication control device according to claim 1, wherein the host vehicle unauthorized state information indicates an unauthorized communication path and the unauthorized host vehicle communication device used for communication which is a cause of the unauthorized state.

5. The communication control device according to claim 1, wherein the unauthorized state is a state in which one of the plurality of host vehicle communication devices, the communication controller, or an information device of the vehicle is infected with malware.

6. The communication control device according to claim 1, wherein the unauthorized state is a state in which one of the plurality of host vehicle communication devices, the communication controller, or an information device of the vehicle has received an unauthorized access.

7. The communication control device according to claim 1, wherein the communication controller executes control for receiving a security patch file against the unauthorized state by using the at least one normal host vehicle communication device.

8. The communication control device according to claim 7, further comprising:
    an unauthorized state eliminator to eliminate the unauthorized state by using the patch file,
    wherein the communication controller executes control for transmitting, when the unauthorized state is eliminated, host vehicle elimination information indicating that the unauthorized state has been eliminated by using any one of the plurality of host vehicle communication devices.

9. The communication control device according to claim 1, further comprising:
    a warning controller to execute at least one of control for causing a display device to display a warning image indicating that the unauthorized state has occurred and control for causing an audio output device to output warning sound indicating that the unauthorized state has occurred.

10. The communication control device according to claim 1,
    wherein, in a case where the unauthorized state has occurred in another vehicle, the communication controller blocks communication between each of the plurality of host vehicle communication devices and an unauthorized other vehicle communication device used for communication which is a cause of the unauthorized state in the other vehicle.

11. A communication control device for a vehicle including a plurality of host vehicle communication devices each including a different communication object, the communication control device comprising:
    an unauthorized state detector to detect an unauthorized state occurring from communication using an unauthorized host vehicle communication device out of the plurality of host vehicle communication devices; and
    a communication controller to execute control for transmitting host vehicle unauthorized state information related to the unauthorized state by using at least one normal host vehicle communication device out of the plurality of host vehicle communication devices excluding the unauthorized host vehicle communication device when the unauthorized state is detected,
    wherein the plurality of host vehicle communication devices comprises a communication device for Internet connection and a communication device for inter-vehicle communication, and
    when receiving other vehicle unauthorized state information related to the unauthorized state in another vehicle from the other vehicle using the communication device for inter-vehicle communication, the communication controller executes control for transmitting the other vehicle unauthorized state information to a server device using the communication device for Internet connection.

12. A communication system including a communication control device for a vehicle including a plurality of host vehicle communication devices each including a different communication object, the communication control device comprising:
   an unauthorized state detector to detect an unauthorized state occurring from communication using an unauthorized host vehicle communication device out of the plurality of host vehicle communication devices; and
   a communication controller to execute control for transmitting host vehicle unauthorized state information related to the unauthorized state by using at least one normal host vehicle communication device out of the plurality of host vehicle communication devices excluding the unauthorized host vehicle communication device when the unauthorized state is detected
   wherein, when the unauthorized state is detected, the communication controller prohibits communication using a direct communication path between the unauthorized host vehicle communication device and an apparatus external to the vehicle, which is otherwise available to the unauthorized host vehicle communication device while operating in an authorized state.

13. The communication system according to claim 12, further comprising a server device to transmit a security patch file against the unauthorized state to the vehicle when receiving the host vehicle unauthorized state information.

14. The communication system according to claim 13,
   wherein, when the unauthorized state is detected, the communication controller prohibits communication using the unauthorized host vehicle communication device, and
   the server device sets a communication path used for transmission of the patch file to a same path as a communication path used for reception of the host vehicle unauthorized state information.

15. The communication system according to claim 13, wherein the server device transmits the patch file to the vehicle and another vehicle.

16. The communication system according to claim 15,
   wherein the host vehicle unauthorized state information indicates a position of the vehicle, and
   the server device sets the other vehicle to which the patch file is to be transmitted depending on a position indicated by the host vehicle unauthorized state information.

17. A communication control method for a vehicle including a plurality of host vehicle communication devices each including a different communication object, the method comprising:
   detecting an unauthorized state occurring from communication using an unauthorized host vehicle communication device out of the plurality of host vehicle communication devices;
   in response to detecting the unauthorized state, prohibiting communication using a direct communication path between the unauthorized host vehicle communication device and an apparatus external to the vehicle, which is otherwise available to the unauthorized host vehicle communication device while operating in an authorized state; and
   executing control for transmitting host vehicle unauthorized state information related to the unauthorized state by using at least one normal host vehicle communication device out of the plurality of host vehicle communication devices excluding the unauthorized host vehicle communication device when the unauthorized state is detected.

* * * * *